(12) United States Patent
Tabone et al.

(10) Patent No.: US 8,996,891 B2
(45) Date of Patent: Mar. 31, 2015

(54) POWER MONITORING AND CONTROL IN CLOUD BASED COMPUTER

(75) Inventors: Ryan Tabone, San Francisco, CA (US);
Ryan Cairns, Sunnyvale, CA (US);
David Moore, San Francisco, CA (US)

(73) Assignee: Google Inc., Mountain View, CA (US)

( * ) Notice: Subject to any disclaimer, the term of this patent is extended or adjusted under 35 U.S.C. 154(b) by 365 days.

(21) Appl. No.: 12/904,132

(22) Filed: Oct. 13, 2010

(65) Prior Publication Data

US 2011/0088039 A1    Apr. 14, 2011

Related U.S. Application Data

(60) Provisional application No. 61/251,286, filed on Oct. 13, 2009.

(51) Int. Cl.
| | | |
|---|---|---|
| G06F 1/00 | (2006.01) | |
| G06F 17/30 | (2006.01) | |
| G06F 21/62 | (2013.01) | |
| H04L 29/08 | (2006.01) | |
| G06F 3/06 | (2006.01) | |

(52) U.S. Cl.
CPC .... *G06F 17/30156* (2013.01); *G06F 17/30097* (2013.01); *G06F 17/30197* (2013.01); *G06F 21/6218* (2013.01); *H04L 67/06* (2013.01); *H04L 67/1097* (2013.01); *G06F 3/0641* (2013.01); *G06F 2221/2103* (2013.01)
USPC .......................................... 713/300; 713/340

(58) Field of Classification Search
USPC ............................. 713/300–344; 709/203–205
See application file for complete search history.

(56) References Cited

U.S. PATENT DOCUMENTS

| | | | |
|---|---|---|---|
| 5,396,537 | A | 3/1995 | Schwendeman |
| 5,581,682 | A | 12/1996 | Anderson et al. |
| 5,761,681 | A | 6/1998 | Huffman et al. |
| 6,401,239 | B1 | 6/2002 | Miron |
| 6,487,588 | B1 | 11/2002 | Phillips et al. |
| 6,493,758 | B1 | 12/2002 | Mclain |
| 7,000,126 | B2 | 2/2006 | Stanley |
| 7,312,771 | B2 | 12/2007 | Iwamura |
| 7,349,955 | B1 | 3/2008 | Korb et al. |
| 7,430,675 | B2 | 9/2008 | Lee |
| 7,598,702 | B2 | 10/2009 | Walrath |
| 7,685,209 | B1 | 3/2010 | Norton et al. |
| 7,987,289 | B2 | 7/2011 | Mason |
| 8,140,873 | B2 | 3/2012 | Hamilton et al. |

(Continued)

FOREIGN PATENT DOCUMENTS

WO     2011046931 A1    4/2011

OTHER PUBLICATIONS

Raymond Ser, "Review: Memopal Online Backup and Storage", Gear Diary, May 5, 2009, 10 pages.*

(Continued)

*Primary Examiner* — Faisal M Zaman
*Assistant Examiner* — Kim Huynh
(74) *Attorney, Agent, or Firm* — Brake Hughes Bellermann LLP

(57) ABSTRACT

According to another general aspect, a method for displaying the system resource usage of a computer may include identifying the number of open tabs in one or more tabbed based browsers running on the computer. The method may include determining the system resource usage of each tab. The method may further include displaying the system resource usage of each tab in a system resource meter.

20 Claims, 18 Drawing Sheets

(56) References Cited

U.S. PATENT DOCUMENTS

| | | | |
|---|---|---|---|
| 8,341,513 | B1 | 12/2012 | Lattyak et al. |
| 8,620,879 | B2 | 12/2013 | Cairns |
| 2003/0065497 | A1 | 4/2003 | Rhoads |
| 2005/0055644 | A1 | 3/2005 | Stockton |
| 2005/0097451 | A1 | 5/2005 | Cormack et al. |
| 2005/0276570 | A1 | 12/2005 | Reed et al. |
| 2006/0031781 | A1* | 2/2006 | Keohane et al. ............... 715/807 |
| 2006/0143282 | A1 | 6/2006 | Brown et al. |
| 2006/0184626 | A1* | 8/2006 | Agapi et al. .................. 709/205 |
| 2006/0253680 | A1 | 11/2006 | Vitanov et al. |
| 2007/0198656 | A1* | 8/2007 | Mazzaferri et al. ........... 709/218 |
| 2007/0288591 | A1 | 12/2007 | Wong et al. |
| 2007/0298773 | A1 | 12/2007 | Uematsu et al. |
| 2008/0005686 | A1* | 1/2008 | Singh ............................ 715/764 |
| 2008/0222506 | A1 | 9/2008 | Petri |
| 2008/0276098 | A1 | 11/2008 | Florencio et al. |
| 2008/0301435 | A1 | 12/2008 | Simon |
| 2008/0313230 | A1 | 12/2008 | Karaoguz et al. |
| 2009/0098914 | A1 | 4/2009 | Martin-Cocher et al. |
| 2009/0164527 | A1 | 6/2009 | Spektor et al. |
| 2009/0164560 | A1 | 6/2009 | Fiatal |
| 2009/0205036 | A1 | 8/2009 | Slaton et al. |
| 2010/0107225 | A1 | 4/2010 | Spencer et al. |
| 2010/0145643 | A1 | 6/2010 | Katpelly et al. |
| 2010/0161759 | A1 | 6/2010 | Brand |
| 2010/0179987 | A1 | 7/2010 | Sebastian et al. |
| 2010/0191783 | A1 | 7/2010 | Mason |
| 2010/0211781 | A1 | 8/2010 | Auradkar |
| 2010/0211782 | A1 | 8/2010 | Auradkar |
| 2010/0222401 | A1 | 9/2010 | Li et al. |
| 2010/0332456 | A1 | 12/2010 | Prahlad |
| 2011/0006881 | A1 | 1/2011 | Hogaboom et al. |
| 2011/0022642 | A1 | 1/2011 | deMilo et al. |
| 2011/0070820 | A1 | 3/2011 | Gao et al. |
| 2011/0071780 | A1 | 3/2011 | Tarkoma |
| 2011/0072378 | A1 | 3/2011 | Nurminen et al. |
| 2011/0072487 | A1 | 3/2011 | Hadar |
| 2011/0087690 | A1 | 4/2011 | Cairns |
| 2011/0087776 | A1 | 4/2011 | Tabone et al. |
| 2011/0087960 | A1 | 4/2011 | Tabone et al. |

OTHER PUBLICATIONS

Cox, et al. "Pastiche: Making Backup Cheap and Easy", 5th Symposium on Operating Systems Design and implementation, vol. 36, No. SI, Dec. 9-11, 2002, 15pages.*

Mandagere, et al. "Demystifying data deduplication", Proceedings of the Middleware '08 Companion, Dec. 1-5, 2008, pp. 12-17.*
Non-Final Office Action for U.S. Appl. No. 12/859,249, mailed Mar. 9, 2012, 14 pages.
Ateniese, et al, "Provable Data Posession at Untrusted Stores", CCS '07, Oct. 29-Nov. 2, 2007, 13 pages.
Cachin, et al, "Trusting the Cloud", IBM Research Zurich Research Laboratory 2009, 6 pages.
Curtmola, et al, "Robust Remote Data Checking", StorageSS '08, Oct. 31, 2008, 6 pages.
Itani, et al, "Privacy as a Service: Privacy-Aware Data Storage and Processing in Cloud Computing Architectures", 2009 Eighth IEEE International Conference on Dependable, Autonomic and Secure Computing, 6 pages.
Wang, et al, "Ensuring Data Storage Security in Cloud Computing", Department of ECE, Illinois Institute of Technology, 2009, 9 pages.
Search Report and Written Opinion for International Application No. PCT/US2010/052320, mailed Feb. 23, 2011, 13 pages.
Raymond Ser, "Review: Memopal Online Backup and Storage", Gear Diary, May 5, 2009, 10 pages.
Cox, et al, "Pastiche: Making Backup Cheap and Easy", 5th Symposium on Operating Systems Design and Implementation, vol. 36, No. SI, Dec. 9-11, 2002, 15 pages.
Muthitacharoen, et al, "A Low-Bandwidth Network File System," Proceedings of the ACM Symposium on Operating Systems Principles, Oct. 21, 2002, pp. 174-187.
Mandagere, et al, "Demystifying data deduplication", Proceedings of the Middleware '08 Companion, Dec. 1-5, 2008, pp. 12-17.
Final Office Action for U.S. Appl. No. 12/859,249, mailed Aug. 16, 2012, 21 pages.
Non-Final Office Action for U.S. Appl. No. 12/904,129, mailed Oct. 3, 2012, 28 pages.
Non-Final Office Action for U.S. Appl. No. 12/904,131, mailed Jul. 19, 2012, 18 pages.
Final Office Action for U.S. Appl. No. 12/904,129, mailed Mar. 11, 2013, 23 pages.
Final Office Action for U.S. Appl. No. 12/904,131, mailed Nov. 19, 2012, 22 pages.
"Edit", Microsoft Computer Dictionary, May 1, 2002, Microsoft Press, 5th Edition, p. 234.
"The History of Android: How We Got To Tasty Ice Cream Sandwich Adnroid 4.0", Zimbio—New Mobile Phones, Feb. 10, 2012, retrieved from http://www.zimbio.com/New+Mobile+Phones/articles/allbf9cx-rc/History+Android+How+Got+Tasty+Ice+Cream+Sandwich, 9 pages.

* cited by examiner

FIG. 7
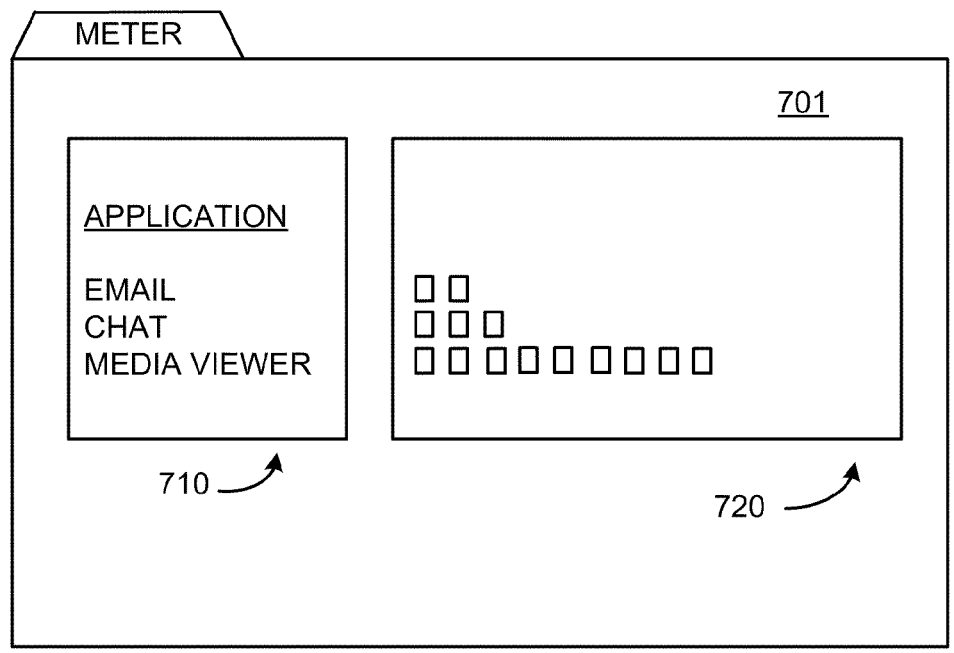
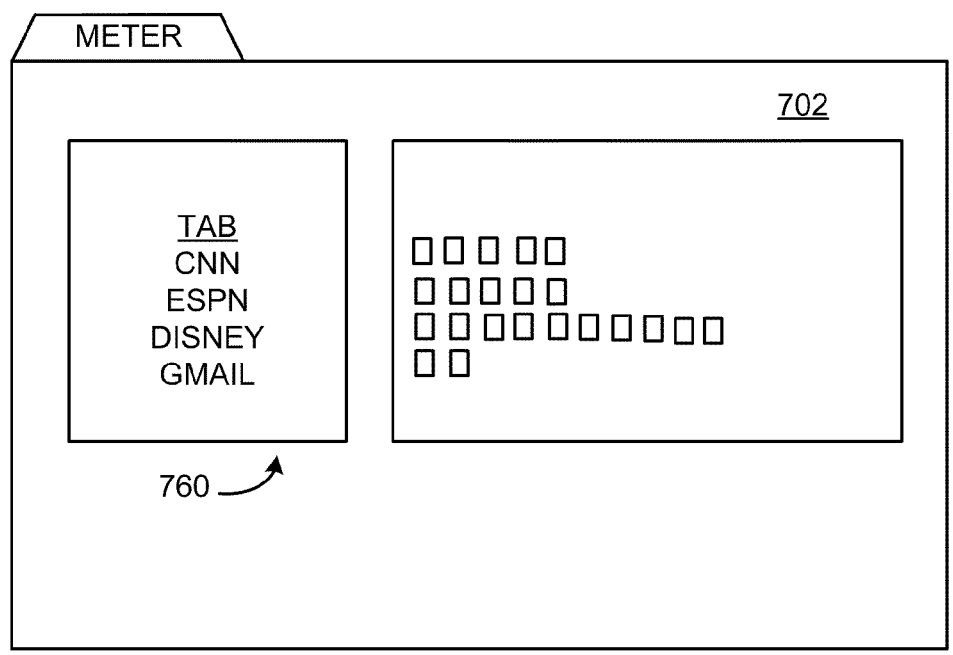

900

1400

FIG. 16
1600
1602 Identifying the number of open tabs in one or more tabbed based browsers running on the computer
1604 Determining the system resource usage of each tab
1606 Displaying the system resource usage of each tab in a system resource meter.
1608 Aging the histogram to remove system resource usage measurements that are older than a predetermined period of time.

1702 Identifying the number of web applications running in open tabs in one or more tab based browsers running on the computer

1704 Measuring the system resource usage of each web application in each open tab

1706 Comparing the system resource usage of each web application in each open tab to a system resource threshold

1708 Throttling any web application in an open tab whose power draw exceeds the system resource threshold

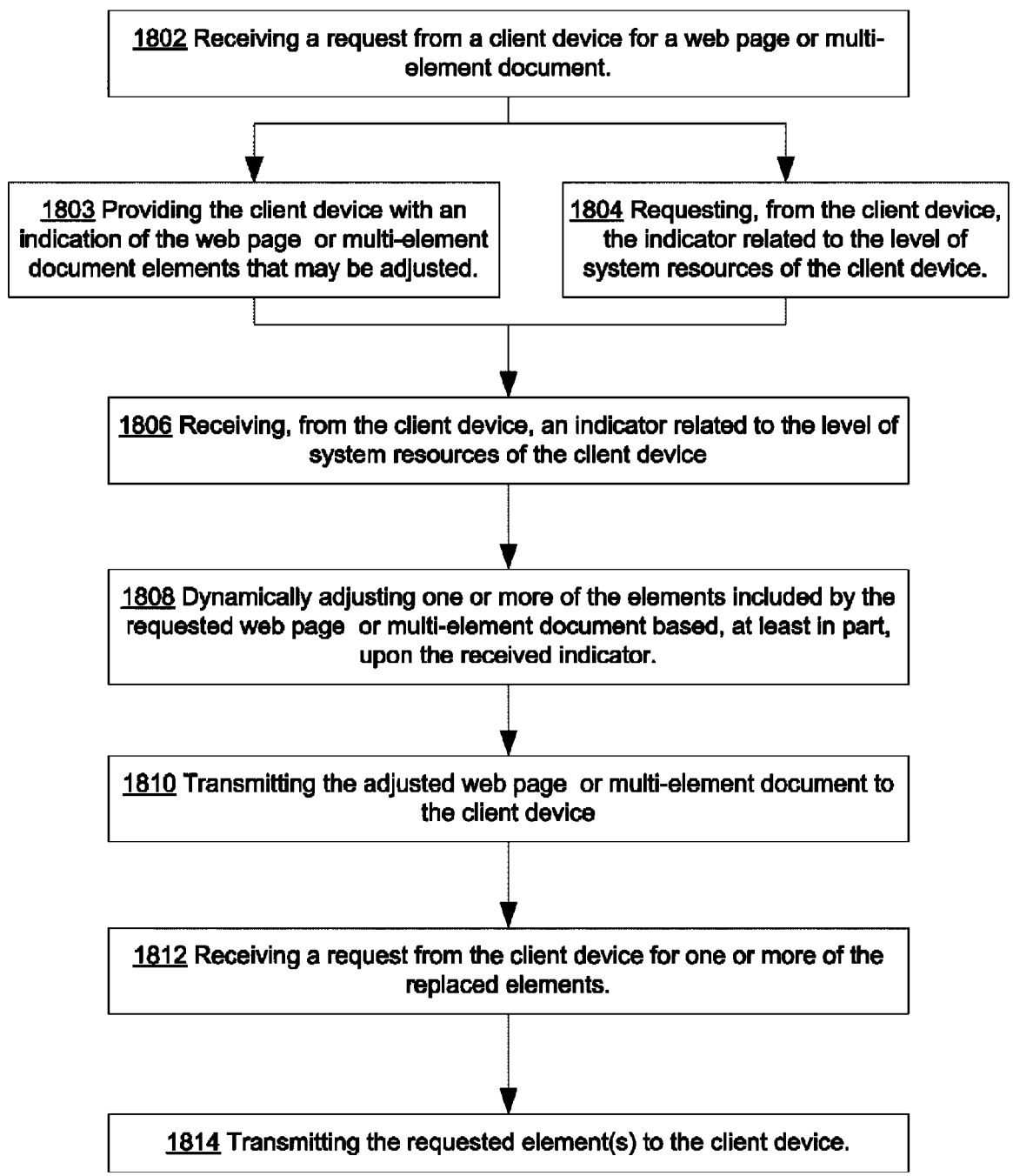

POWER MONITORING AND CONTROL IN CLOUD BASED COMPUTER

CROSS-REFERENCE TO RELATED APPLICATION

This application claims priority to U.S. Provisional Patent Application 61/251,286, filed Oct. 13, 2009, titled "POWER MANAGEMENT AND DATA CACHING IN A COMPUTING PLATFORM," which is incorporated herein by reference in its entirety.

TECHNICAL FIELD

This description relates to the management of system resources of an apparatus, and more specifically to the dynamic alteration or editing of a multi-element document based upon the available system resources.

BACKGROUND

Generally, web pages, other multi-element documents, or data are provided by a server to a client or requesting device across a network or communications channel. Generally, the server provides the web page to the client or requesting devices regardless of the capabilities of the client or requesting device. Frequently, if a client or requesting device wishes to receive a web page or other information suited to the device's capabilities, the client or requesting device may sometimes requests a special web page (e.g., a web page tailored for mobile devices, etc.).

Further, as web pages become more complex (e.g., including video, audio, dynamically executing scripts, streaming media, running executable code, etc.) the amount of system resources consumed by rendering or displaying the web pages increases. For example, highly complex web pages, may include a number of features or elements which cause a noticeable consumption of a client device's battery power or a sizable portion of the available bandwidth used to communicate with the server.

SUMMARY

According to one general aspect, a method of regulating the system resource consumption of an apparatus may include monitoring one or more system resources of the apparatus. The method may also include receiving a request to display, via the apparatus, a requested multi-element document. The method may include retrieving by the apparatus, at least in part, the requested multi-element document. The method may include dynamically editing the requested multi-element document based, at least in part, upon the monitored system resources. The method may also include displaying the dynamically edited multi-element document.

According to another general aspect, an apparatus may include a processor, a network interface and a memory. The network interface may be configured to send and receive signals as part of operating within a communications network. The memory may be configured to store executable code. When the executable code is executed it may cause the apparatus to monitor one or more system resources of the apparatus. The apparatus may receive a request to display, via the apparatus, a requested multi-element document. The apparatus may also retrieve by the apparatus, at least in part, the requested multi-element document. The apparatus may dynamically edit the requested multi-element document based, at least in part, upon the monitored system resources; and display the dynamically edited multi-element document.

According to another general aspect, a computer-readable medium may be tangibly embodied and include executable code. The executable code, when executed, may be cause an apparatus to: receive a request from a client device for a multi-element document; receive, from the client device, an indicator related to the level of system resources of the client device; dynamically adjust one or more of the elements included by the requested multi-element document based, at least in part, upon the received indicator; and transmit the adjusted multi-element document to the client device.

According to another general aspect, a method for displaying the system resource usage of a computer may include identifying the number of open tabs in one or more tabbed based browsers running on the computer. The method may include determining the system resource usage of each tab. The method may further include displaying the system resource usage of each tab in a system resource meter.

According to another general aspect, a method of preserving one or more system resources in a computer may include identifying the number of web applications running in open tabs in one or more tab based browsers running on the computer. The method may include measuring the system resource usage of each web application in each open tab. The method may include comparing the system resource usage of each web application in each open tab to a system resource threshold. The method may also include throttling any web application in an open tab whose power draw exceeds the system resource threshold.

According to another general aspect, an apparatus may include a processor and a memory. The memory may to store executable code that, when executed, causes the apparatus to: measuring the system resource usage of each web application in each open tab; comparing the system resource usage of each web application in each open tab to a system resource threshold; and throttling any web application in an open tab whose power draw exceeds the system resource threshold.

According to another general aspect, a computer readable medium may be tangibly embodied on a computer-readable medium and include excusable code. The executable code may, when executed, cause a data processing apparatus to: monitor one or more system resources of the apparatus; receive a request to display, via the apparatus, a requested multi-element document; retrieve by the apparatus, at least in part, the requested multi-element document; dynamically editing the requested multi-element document based, at least in part, upon the monitored system resources; and display the dynamically edited multi-element document.

According to one general aspect, a method of providing data to a client device may include receiving a request from a client device for a multi-element document. The method may also include receiving, from the client device, an indicator related to the level of system resources of the client device. The method may include dynamically adjusting one or more of the elements included by the requested multi-element document based, at least in part, upon the received indicator. The method may further include transmitting the adjusted multi-element document to the client device.

According to another general aspect, an apparatus may include a processor, a network interface, and a memory. The network interface may be configured to send and receive signals as part of operating within a communications network. The memory may be configured to store executable code. The executable code may, when executed, cause the apparatus to receive a request from a client device for a multi-element document. The apparatus may receive, from the client device, an indicator related to the level of system resources of the client device. The apparatus may dynamically adjust one or more of the elements included by the requested multi-element document based, at least in part, upon the received indicator; and transmit the adjusted multi-element document to the client device.

The details of one or more implementations are set forth in the accompanying drawings and the description below. Other features will be apparent from the description and drawings, and from the claims.

A system and/or method for managing system resources, substantially as shown in and/or described in connection with at least one of the figures, as set forth more completely in the claims.

BRIEF DESCRIPTION OF THE DRAWINGS

FIG. 7 is a diagram of two example embodiments of a user interface in accordance with the disclosed subject matter.

FIG. 16 is a flowchart of an example embodiment of a technique in accordance with the disclosed subject matter.

FIG. 17 is a flowchart of an example embodiment of a technique in accordance with the disclosed subject matter.

FIG. 18 is a flowchart of an example embodiment of a technique in accordance with the disclosed subject matter.

Like reference symbols in the various drawings indicate like elements.

DETAILED DESCRIPTION

Described herein are a device and a technique for operating a device to conserve system resources (e.g., battery power, network bandwidth, etc.). Both a client-side embodiment and a server-side embodiment are disclosed below. Further, two embodiments of the main client-side embodiment are disclosed below. Generally, a client device may request a web page or web application. In addition, the client device may monitor its usage of system resources. Based upon the level of various system resources, the requested web page or web application may be edited or adjusted. In one embodiment, the client device may edit the requested web page, once it has been received. In another embodiment, the server may edit or adjust the web page before transmitting it to the client device. Further, the client device may monitor the consumption of system resources by web pages or web applications displayed on the client device. In response to the respective web page's system resource consumption, the client device may dynamically throttle the consumption of system resource (e.g., reduce the number of execution cycles allotted to the web application, etc.). It is understood that the above are merely a few illustrative examples to which the disclosed subject matter is not limited.

Figure 1:
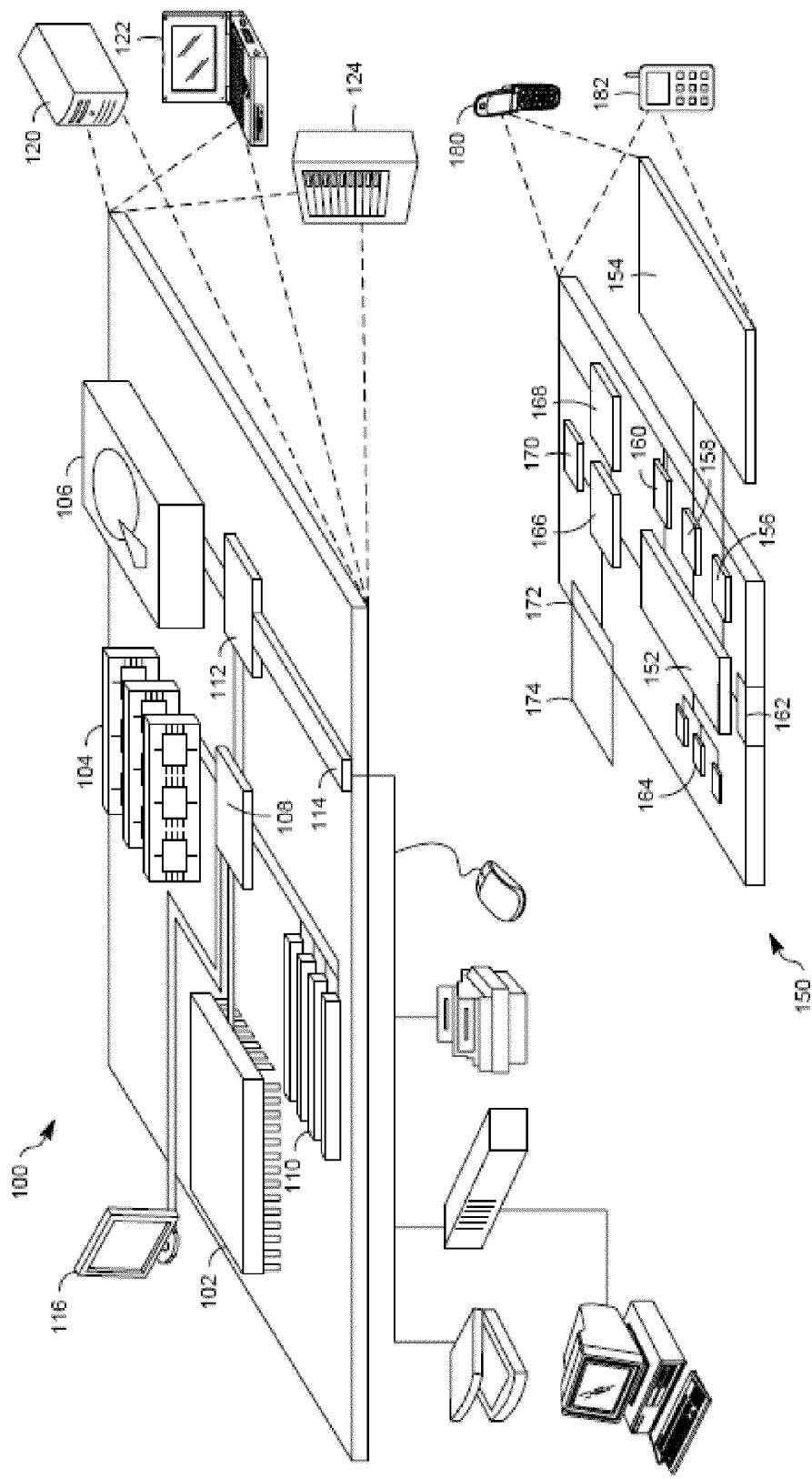
FIG. 1 is a block diagram of an example embodiment of a system in accordance with the disclosed subject matter.

FIG. 1 shows an example of a generic computer device 100 and a generic mobile computer device 150, which may be used with the techniques described here. Computing device 100 is intended to represent various forms of digital computers, such as laptops, desktops, workstations, personal digital assistants, servers, blade servers, mainframes, and other appropriate computers. Computing device 150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 100 includes a processor 102, memory 104, a storage device 106, a high-speed interface 108 connecting to memory 104 and high-speed expansion ports 110, and a low speed interface 112 connecting to low speed bus 114 and storage device 106. Each of the components 102, 104, 106, 108, 110, and 112, are interconnected using various busses, and may be mounted on a common motherboard or in other manners as appropriate. The processor 102 can process instructions for execution within the computing device 100, including instructions stored in the memory 104 or on the storage device 106 to display graphical information for a graphical user interface (GUI) on an external input/output device, such as display 116 coupled to high speed interface 108. In other implementations, multiple processors and/or multiple buses may be used, as appropriate, along with multiple memories and types of memory. Also, multiple computing devices 100 may be connected, with each device providing portions of the necessary operations (e.g., as a server bank, a group of blade servers, or a multi-processor system, etc.).

The memory 104 stores information within the computing device 100. In one implementation, the memory 104 includes a volatile memory unit or units. In another implementation, the memory 104 includes a non-volatile memory unit or units. The memory 104 may also be another form of computer-readable medium, such as a magnetic or optical disk.

The storage device 106 is capable of providing mass storage for the computing device 100. In one implementation, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

The high speed controller 108 manages bandwidth-intensive operations for the computing device 100, while the low speed controller 112 manages lower bandwidth-intensive operations. Such allocation of functions is exemplary only. In one implementation, the high-speed controller 108 is coupled to memory 104, display 116 (e.g., through a graphics processor or accelerator), and to high-speed expansion ports 110, which may accept various expansion cards (not shown). In the implementation, low-speed controller 112 is coupled to storage device 106 and low-speed expansion port 114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 100 may be implemented in a number of different forms, as shown in the figure. For example, it may be implemented as a standard server 120, or multiple times in a group of such servers. It may also be implemented as part of a rack server system 124. In addition, it may be implemented in a personal computer such as a laptop computer 122. Alternatively, components from computing device 100 may be combined with other components in a mobile device (not shown), such as device 150. Each of such devices may contain one or more of computing device 100, 150, and an entire system may be made up of multiple computing devices 100, 150 communicating with each other.

Computing device 150 includes a processor 152, memory 164, an input/output (I/O) device such as a display 154, a communication interface 166, and a transceiver 168, among other components. The device 150 may also be provided with a storage device, such as a micro-drive or other device, to provide additional storage. Each of the components 150, 152, 164, 154, 166, and 168, are interconnected using various buses, and several of the components may be mounted on a common motherboard or in other manners as appropriate.

The processor 152 can execute instructions within the computing device 150, including instructions stored in the memory 164. The processor may be implemented as a chipset of chips that include separate and multiple analog and digital processors. The processor may provide, for example, for coordination of the other components of the device 150, such as control of user interfaces, applications run by device 150, and wireless communication by device 150.

Processor 152 may communicate with a user through control interface 158 and display interface 156 coupled to a display 154. The display 154 may be, for example, a TFT LCD (Thin-Film-Transistor Liquid Crystal Display) or an OLED (Organic Light Emitting Diode) display, or other appropriate display technology. The display interface 156 may comprise appropriate circuitry for driving the display 154 to present graphical and other information to a user. The control interface 158 may receive commands from a user and convert them for submission to the processor 152. In addition, an external interface 162 may be provide in communication with processor 152, so as to enable near area communication of device 150 with other devices. External interface 162 may provide, for example, for wired communication in some implementations, or for wireless communication in other implementations, and multiple interfaces may also be used.

The memory 164 stores information within the computing device 150. The memory 164 can be implemented as one or more of a computer-readable medium or media, a volatile memory unit or units, or a non-volatile memory unit or units. Expansion memory 174 may also be provided and connected to device 150 through expansion interface 172, which may include, for example, a SIMM (Single In Line Memory Module) card interface. Such expansion memory 174 may provide extra storage space for device 150, or may also store applications or other information for device 150. Specifically, expansion memory 174 may include instructions to carry out or supplement the processes described above, and may include secure information also. Thus, for example, expansion memory 174 may be provide as a security module for device 150, and may be programmed with instructions that permit secure use of device 150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 164, expansion memory 174, or memory on processor 152, that may be received, for example, over transceiver 168 or external interface 162.

Device 150 may communicate wirelessly through communication interface 166, which may include digital signal processing circuitry where necessary. Communication interface 166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 168. In addition, short-range communication may occur, such as using a Bluetooth, WiFi, or other such transceiver (not shown). In addition, GPS (Global Positioning System) receiver module 170 may provide additional navigation- and location-related wireless data to device 150, which may be used as appropriate by applications running on device 150.

Device 150 may also communicate audibly using audio codec 160, which may receive spoken information from a user and convert it to usable digital information. Audio codec 160 may likewise generate audible sound for a user, such as through a speaker, e.g., in a handset of device 150. Such sound may include sound from voice telephone calls, may include recorded sound (e.g., voice messages, music files, etc.) and may also include sound generated by applications operating on device 150.

The computing device 150 may be implemented in a number of different forms, as shown in the figure. For example, it may be implemented as a cellular telephone 180. It may also be implemented as part of a smart phone 182, personal digital assistant, or other similar mobile device.

Figure 2:
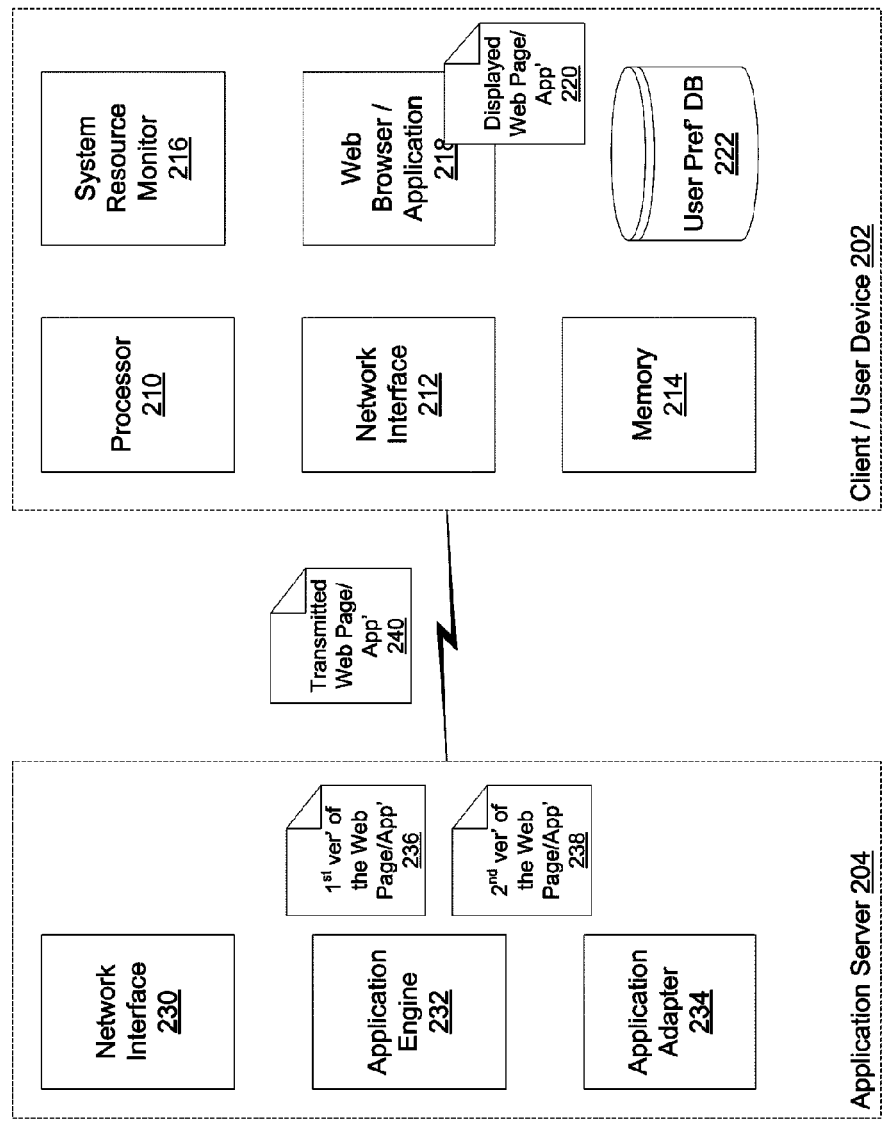
FIG. 2 is a block diagram of an example embodiment of a system in accordance with the disclosed subject matter.

FIG. 2 is a block diagram of an example embodiment of a system 200 in accordance with the disclosed subject matter. In one embodiment, the system 200 may include a client or user device 202 which is configured to be controlled or accessed by a user 290, and an application server 204. The application server 204 may be configured to serve or transmit one or more web pages or multi-element documents (e.g., web page 220) to the client or user device 202.

In this context, the term "web page" includes a document or resource of information that is suitable for transmission over a network (e.g., the Internet, an intranet, etc.) and includes a plurality of elements. The disclosed subject matter is not limited to a web page, but the term "web page" provides a readily understandable embodiment. In general the disclosed subject matter may apply to any multi-element document, file or data.

Generally a web page may be accessed through a web browser and is often displayed on a monitor or screen of a receiving device (e.g., client device 200). This information is usually in Hypertext Markup Language (HTML) or Extensible HTML (XHTML) format. The web page may include a plurality of elements, each element configured to define another resource or information and the resource's place within the structure of the defining web page. Such elements may include, for example, images, videos, Universal Resource Locators (URLs), client-side scripts to be executed by the client device, executable code to be executed by the client device, other documents, etc. Web pages may include files of static text (e.g., static web pages), or may be constructed by server when they are requested (dynamic web pages).

In one embodiment, web pages that make extensive use of client-side scripting or client-side executable code (e.g., Flash, Java, SilverLight, etc.) may be referred to, in this context, as "web applications". In various embodiments, a web application may include an application that is accessed over a network such as the Internet or an intranet. The term may also mean a computer software application that is hosted in a browser-controlled environment (e.g., a Java applet, etc.) or coded in a browser-supported language (e.g., JavaScript and HTML) and reliant on a common web browser to render the application executable. An application, is computer software designed to help the user to perform singular or multiple related specific tasks (e.g., a word processor, an image editing application, etc.). A web application, as described above, may include an application that is accessed over a network such as the Internet or an intranet and hosted within a browser-controlled environment.

In some embodiments, these web applications may be compared to less active or more inactive web pages in which the content of the web page may be consumed or read by the user, but not altered. Active web pages may include actively changing web page elements (e.g., play a video, an animated image, stream audio, executable code, etc.). While web applications may be thought of as "active web pages", it is understood that the term "active web page" may include web pages do not rise to the level of complexity as web applications. For example, an active web page may include a video web page element, but may not make be sufficiently complex or help the user to perform singular or multiple related specific task to be considered an application.

In one embodiment, the system 200 may include a client or user device 202. The client or user device 202 may include a system resource monitor 216 configured to monitor the level of system resources provided or available to the client or user device 202. System resources may include the resources such as: the amount of operating power available to the device 202, whether the operating power is provided by a battery or a substantially continuous supply (e.g., wall electrical socket), the amount of bandwidth provided by the communications channel or network employed by the device 202, the type of communications network or protocol employed by the device 202 (e.g., a cellular network, a wireless local area network (WLAN), a Wi-Fi network, a wired network, third generation (3G) cellular network, etc.), the amount of processing power (e.g., provided by processor 210) of the device 202, the size and capabilities of the display (not shown) of the device 202, the amount of free memory 214 of the device 202, etc., although it is understood that the above are merely a few illustrative examples to which the disclosed subject matter is not limited.

In one embodiment, the user 290 may request a web page or web application from the application server 204. The client or user device 202 may communicate this request to the server 204 via the network interface 212. The server 204 may transmit the requested web page 240 to the client or user device 202. In a first embodiment, the client device 202 may then dynamically edit or adjust the requested web page 240 based upon the system resources available to the client device 202, and ultimately display the edited web page 220. In a second embodiment, the server 204 may be informed of the system resources available to the client device 202, and then the server 204 may adjust the requested web page based upon those system resources. The server 204 may then transmit the adjusted web page 240 to the client or user device 202. This adjusted web page may be displayed to the user 290. In yet another embodiment, a combination of the two prior embodiments may be employed and are within the scope of the disclosed subject matter.

Accordingly, the first above embodiment will be described first. In this embodiment, the client or user device 202 may regulate the consumption of system resources. As described above, the user 290 may request a web page from the application server 204. The application server 204 would then provide this web page 240, which would be received by the client device 202.

The client device 202 may include a system resource monitor 216. In various embodiments, the system resource monitor 216 may be configured to monitor the level or capabilities (e.g., amount of battery power, the bandwidth available, etc.) of one or more system resources of the client device 202. This information may be provided to the web browser or other application 218.

The web browser or other application 218 may be configured to display or render the requested web page as displayed web page 220. In the illustrated embodiment, the web browser 218 may be configured to display or render the requested or received web page 240 based upon the level of system resources available to the client device 202, as monitored by the system resource monitor 216. In such an embodiment, the web browser 218 may dynamically edit or adjust the rendering of the web page 240. In various embodiments, this editing or adjustment may include the creation of an edited web page (e.g., displayed web page 220).

In one example embodiment, the web browser 218 may be informed that the amount of operating power available to the device 202 is running low. In response, the web browser 218 may edit or adjust the received web page 240 such that the display or processing of the web page 240 may consume less power than web page 240 would if unedited. For example, elements of the received web page 240 (e.g., video, executable scripts or code, etc.) may be edited, removed, or replaced with substitute elements that consume less power (e.g., static images, static text, longer refresh rates, etc.). Although, it is understood that the above is merely one illustrative example to which the disclosed subject matter is not limited.

Other examples may include, but are not limited to: replacing large or complex images with smaller or simpler images, editing client-side scripts to reduce the amount of system resources consumed by the execution of the script (e.g., reducing the frequency at which a script refreshes data, removing graphical effects, etc.), limiting or stopping the execution of compiled executable code or a plug-in based element (e.g., Flash, Java, SilverLight, etc.), lowering the bitrate of a video or audio stream, etc. It is understood that the above are merely a few illustrative examples to which the disclosed subject matter is not limited.

In various embodiments, the user 290 may be provided with an indication that the requested web page 240 has been edited to create the edited or displayed web page 220. In such an embodiment, the user 290 may be able to request that one or more of the edits or alterations be un-done. For example, if a video element has been replaced with a static image element, the user 290 may request that the original video element be restored to the edited web page 220. In some embodiments, the web browser or other application 216 may be configured to re-edit the web page 240 or 220 to restore a previously removed, replaced, or edited element. After the restoration has occurred, the new edited web page, now including the requested element (e.g., the video element, etc.), may be displayed.

In one embodiment, the user 290 or other entity (e.g., an administrator, the application 218 developer, etc.) may establish one or more predetermined preferences indicating what elements and how elements should be edited. For example, a user preference may exist indicating that video elements below a certain size should remain un-edited, that web pages from certain servers or web sites should remain un-edited, that image elements having certain shapes and positions within the web pages (e.g., banners, footers, etc.) should be edited, etc., although it is understood that the above are merely a few illustrative examples to which the disclosed subject matter is not limited.

In some embodiments, the client device 202 may include a learning component which, while possibly starting with the predetermined preferences, dynamically adjusts the editing process based upon feedback to the edits. In such an embodiment, the client device 202 may monitor or record which elements the user 290 indicated they wanted restored or interacted with. For example, the user's request to turn on or restore a video element may be recorded, and cause the video element or a similar video element to not be replaced or removed in a subsequent editing of a web page. In various embodiments, this feedback information may affect re-requests of the same web page, web pages from the same server, or web pages from all servers in general, or a combination thereof. It is understood that various levels of monitoring and correlation of user preferences with web page elements, web pages, and web sites are contemplated. In various embodiments, these feedback preferences and/or predefined preferences may be stored within a user preference database or repository 222.

In another embodiment, the monitored system resources may be sufficiently plentiful that the web browser or other application 218 does not edit the requested web page 240, but merely displays the web page 240 in an un-edited form. For example, if the client device 202 is operating via a wall electrical outlet and a wired network connection, the web browser 218 may provide no benefit by reducing the power and/or bandwidth consumption of the requested web page 240, although it is understood that the above is merely one illustrative example to which the disclosed subject matter is not limited.

In such an embodiment, the determination of what amount or even the type or kind of editing or adjustment that may be applied to a requested web page 240 may be determined by one or more predefined threshold values relating to the monitored system resources. For example, the requested web page 240 may be edited for purposes of power consumption only if, in one embodiment, the device 202 is operating with a battery having less than a 50% charge. In some embodiments, secondary thresholds may be defined which dictate what elements are to be edited or adjusted. For example, an element may be edited if more than a threshold amount of a given system resource would be consumed, etc. It is understood that the above are merely a few illustrative examples to which the disclosed subject matter is not limited.

In various embodiments, the editing or adjusting of the requested web page 240 may occur before the entirety of the requested web page 240 has been received. Often a web page includes a variety of data portions or files (e.g., the structure or HTML document, the images, the videos, the executable code, the client-side scripts, etc.). These various pieces of data may be transmitted to the client device 202 as a number of distinct files or messages. In such an embodiment, the client device 202 may be configured to receive a file or message which defines the structure and elements of the requested web page 240. The client device 202 may then edit or adjust this structural definition of the web page. Based upon this edited portion of the web page, the client device 202 may not request some files or data that, while included in the original requested web page 240, are no longer included by the edited web page 220. For example, if a video file, or more accurately the element associated with the video file, is replaced or removed as part of the editing process, the client device 202 may refrain from downloading or requesting the removed video file.

In another embodiment, the client device 202 may receive all of the files or data associated with the requested web page 240, and then cache or discard files or data no longer referred to by the edited web page 220. If cached, these removed files or data may be stored in the memory 214 and quickly accessible (e.g., without the need for a network-based file request, etc.) if the user 290 requests their restoration. Although, it is understood that the above is merely one illustrative example to which the disclosed subject matter is not limited.

Returning to the second above embodiment, in this embodiment, the application server 204 may regulate or help regulate the consumption of system resources. As described above, the user 290 may request a web page from the application server 204. In this embodiment, upon receiving the web page 240, the client device 202 may simply display the received web page 240 to the user 290 without any editing. It may be the application server 204 which edits or adjusts the web page prior to transmitting it the client device 202. However, in various embodiments, combinations of the first client-side embodiment and the second server-side embodiment may exist.

In one embodiment, in addition to the request for the web page 240, the server 204 may receive an indication or indicator, from the client device 202, related to the level of system resources of the client device 202 (e.g., as monitored by the system resource monitor 216, etc.). Based, at least in part, upon the indication of the system resources of the client device 202, the server 204 may be configured to adjust or edit the requested web page to accommodate the level of client device 202's system resources.

In various embodiments, the server 204 may be better positioned or better aware than the client device 202 to edit or adjust the requested web page. For example, the client device 202 may not be able to sufficiently understand the client-side scripts or executable code. In some embodiments, the server 204, or the developer (not shown) who created the web page, may be better able to edit or adjust the client-side scripts or executable code. It is understood that the above are merely a few illustrative examples to which the disclosed subject matter is not limited.

For example, the server 204 may include a plurality of versions of the requested web page (e.g., web pages 236 and 238, etc.). One of these web pages 236 may be designed or configured to be used on a client device 202 with an abundance of system resources (e.g., the web page 236 may include streaming media, executable code, Web 2.0 scripting, etc.) or an otherwise active web page. Another of the web pages 238 may be designed or configured to be used on a client device 202 with a dearth of system resources (e.g., including static text, a few static images, etc.) or otherwise an inactive web page. It is understood that while only two illustrative web pages (e.g., web pages 236 and 238, etc.) the disclosed subject matter is not limited to any such number.

In one embodiment, the server 204 may include an application adapter 234 configured to dynamically adjust one or more of the elements included by the requested web page based, at least in part, upon the received indicator of the client device's 202 system resources. In various embodiments, the application adapter 234 may select one of the plurality of web pages (e.g., web pages 236 or 238, etc.) to fulfill the request for a given web page. In a specific embodiment, a high system resource version of the requested web page 236 may include a number of client-side scripts (e.g., Asynchronous JavaScript (AJAX)), executable code (e.g., Flash, etc.), and/or streaming media, which may consume a relatively large amount of operating power and network bandwidth. Conversely, a low system resource version of the requested web page 238 may merely include text-based HTML and with hyperlinks (e.g., as opposed to scripted links).

In another embodiment, the application adapter 234 may edit the requested web page. The application adapter 234 may edit elements based upon the indicated level of system resources of the client device 202. For example, if the client device 202 is low on operating power, the application adapter 234 may be configured to edit client-side scripts or timers to reduce the frequency at which actions (e.g., a web page refresh or reload, etc.) occur, select different graphical elements (e.g., images, videos, executable code-based animations, etc.) to reduce the amount of system resources (e.g., bandwidth, etc.) consumed as a result of the web page, etc. It is understood that the above are merely a few illustrative examples to which the disclosed subject matter is not limited.

In various embodiments, the edited web page (e.g., web page 236) may be further processed by an application engine 232. The application engine 232 may be configured to dynamically build or create the web page 240 based upon various variables. Such dynamic creation may include server-side scripting, database look-ups, merging multiple files into a single web page 240, etc. In such an embodiment, the adjusted web page (e.g., web page 236) may include a template web page which is then expanded upon (e.g., by the insertion of data or variables, etc.) by the application engine 232 to create the transmitted web page 240. For example, the main web page of a news site may dynamically create their front page by replacing placeholder variables (defined by a web page template) with news stories, headlines, and images.

Figure 3:
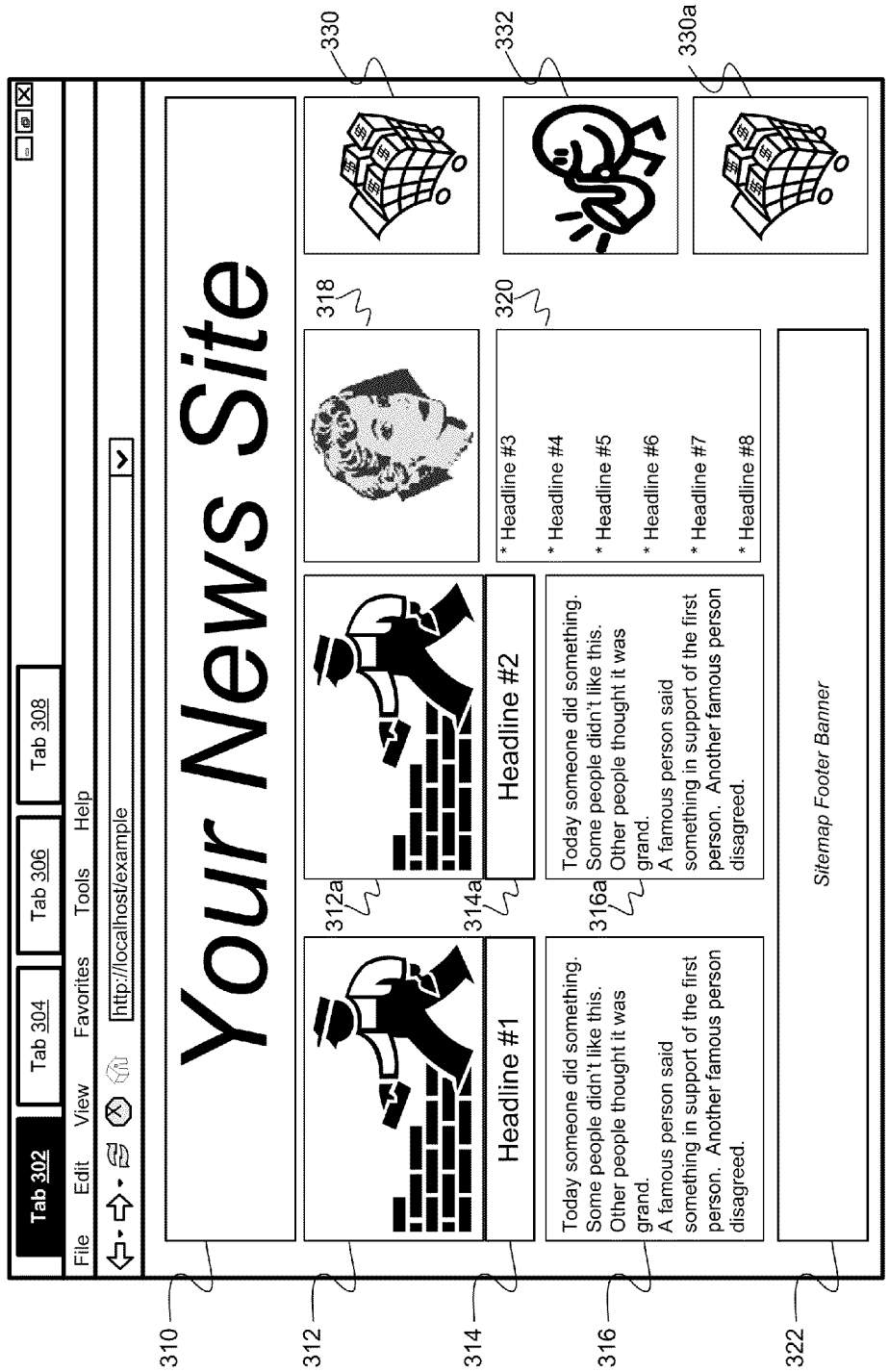
FIG. 3 is a diagram of an example embodiment of a user interface in accordance with the disclosed subject matter.

FIG. 3 is a diagram of an example embodiment of a user interface (UI) 300 in accordance with the disclosed subject matter. UI 300 illustrates an example form of a web page that may be displayed by a web browser or other application. Illustrated is a news web page, but it is understood that the above is merely one illustrative example to which the disclosed subject matter is not limited.

In one embodiment, the UI 300 may include a plurality of tabs 302, 304, 306, 308, etc. Each of these tabs 302, et al. may be configured to display a web page. Tab 302 may be in the foreground or "have focus" within the UI 300. In this context, the phrase "have focus" and its derivatives may mean that the operating system or application has determined that the focused UI element (e.g., tab, text field, etc.) is designated as the UI element configured to receive user input. In the illustrated embodiment, this focus on tab 302 is illustrated by the highlighting of the handle of tab 302. Tabs 304, 306, and 308 are in the background and do not have focus, but may each include a web page and include various web page elements which consume resources.

In one embodiment, the client device or apparatus may be configured to edit the web pages displayed or included in the background or out-of-focus tabs (e.g., tabs 304, 306, 308, etc.) first or before the displayed or focused web page of tab 302. In such an embodiment, selectively editing tabs 304, 306 or 308, which the user is not interacting with, may conserve enough system resources to allow the web page of tab 302 to be displayed without edits. Examples of edits or adjustments to the web pages included by tabs 304, 306, or 308 may include, but are not limited to, the stopping the streaming of media (e.g., video, audio, etc.), the removal of an animation, the removal or cessation of execution of a client-side script or executable code, etc. As indicated in the examples above, the adjustment of the web pages may include a change in state (e.g., from playing to stopped or paused, etc.) of a web page element (e.g., video, audio, etc.), instead of the removal, replacement, or alteration of the web page element.

Figure 4:
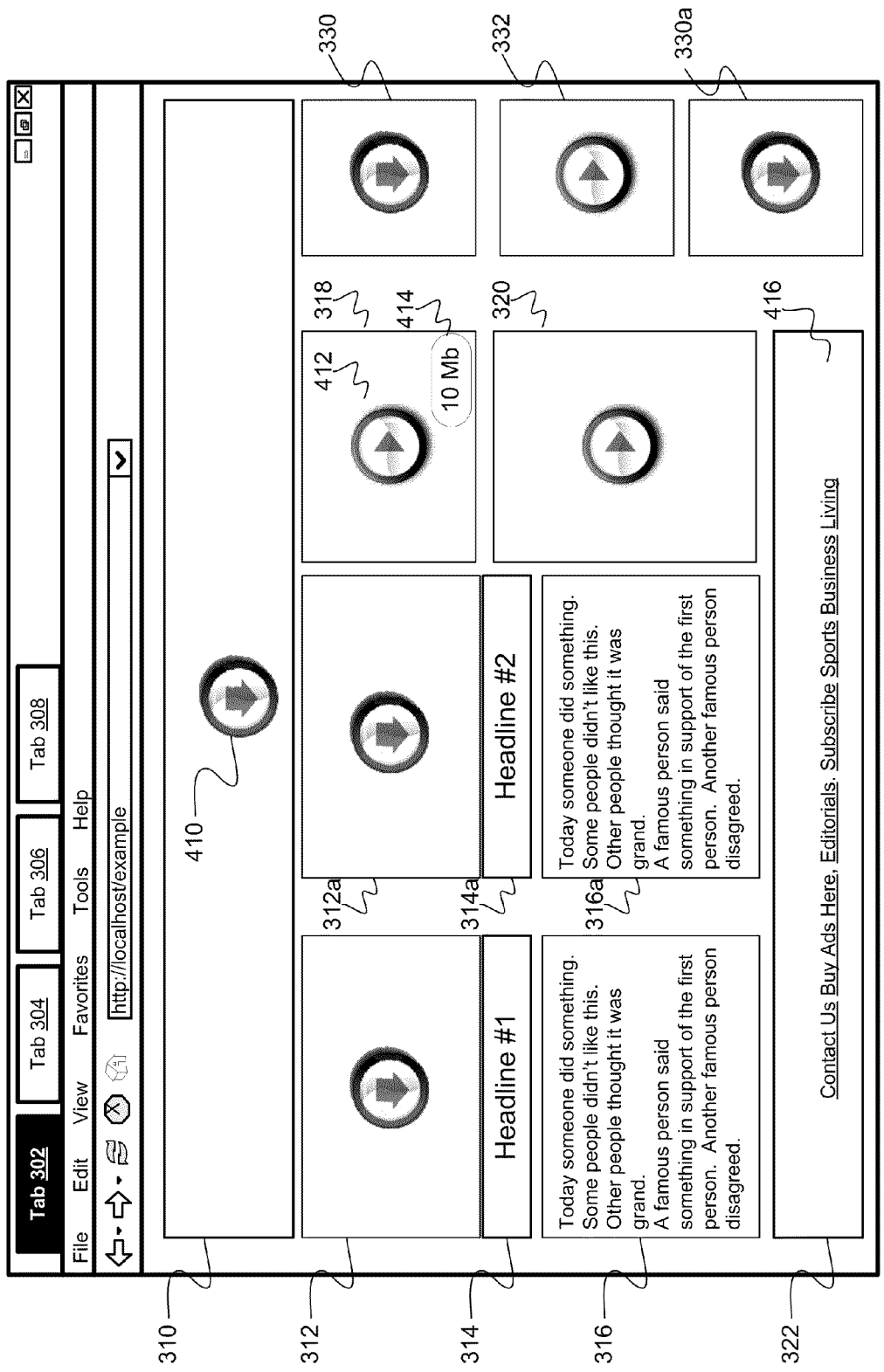
FIG. 4 is a diagram of an example embodiment of a user interface in accordance with the disclosed subject matter.
Figure 11:
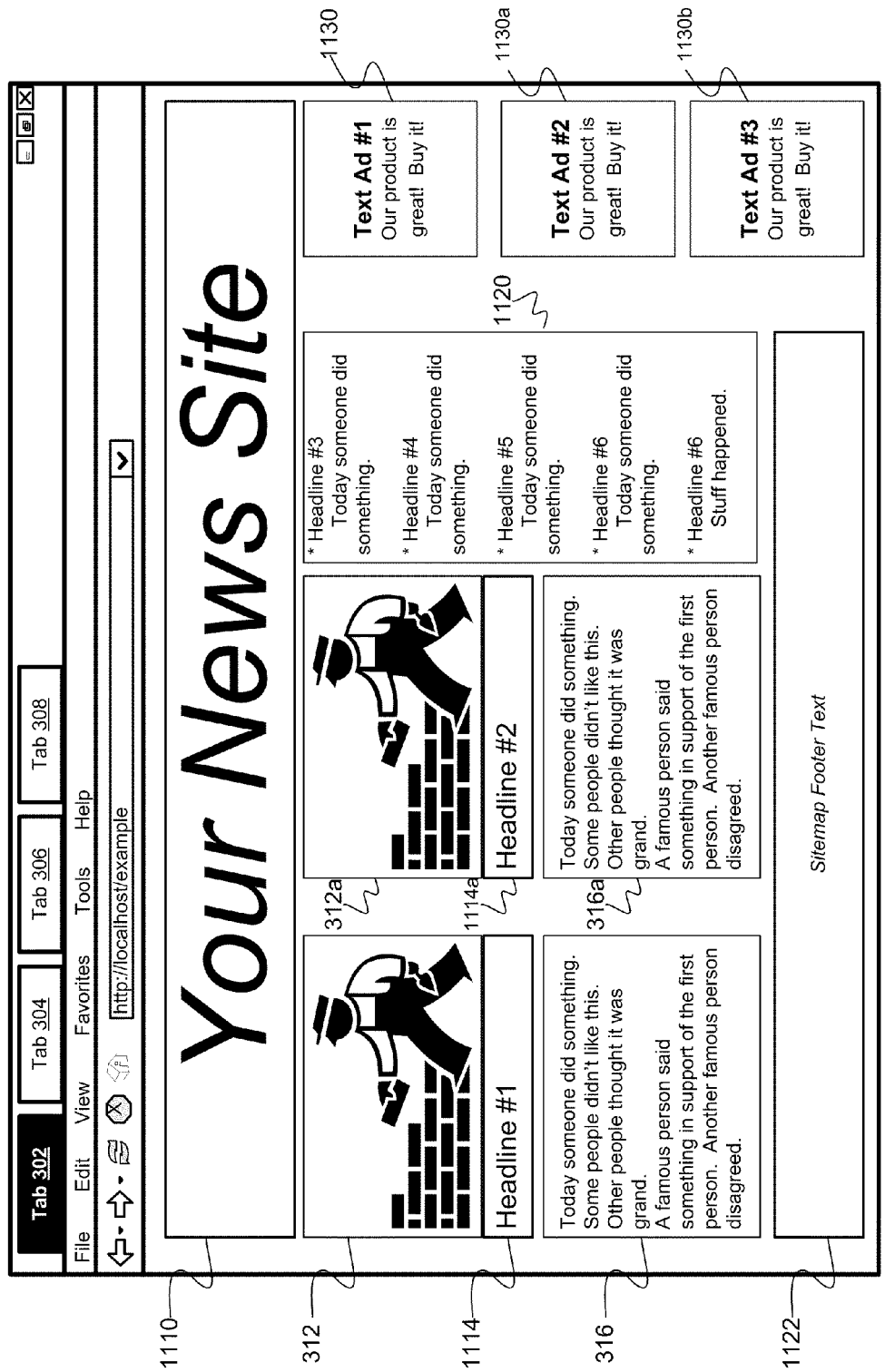
FIG. 11 is a diagram of an example embodiment of a user interface in accordance with the disclosed subject matter.

Returning to the focused tab 302, a sample web page is illustrated. The sample may include a news web page, such as the news site's index or home web page. The illustrated web page of tab 302 is shown in an un-edited or un-adjusted form and may include the web page as requested from an application server (e.g., server 204 of FIG. 2). In contrast FIGS. 4 and 11 illustrate sample adjustments or edited forms of the web page that may be made or result from the client device or server, respectively. The web page of tab 302 may be displayed by the client device when there are sufficient system resources to do so, or when sufficient system resources have been conserved by editing or adjusting one or more of the background tabs 304, 306, or 308, as described above. In one embodiment that includes a multi-threaded or multi-process operating system configured to execute multiple applications substantially simultaneously, other system resource conservations may be made by editing or altering the behavior or content of other applications or web browsers (not shown).

In the illustrated embodiment, the web page of tab 302 may include a number of graphical or image web elements. For example, a banner for the news site may be shown by element 310. A footer image element 322 may include image mapped web element configured to map portions of the image to various hyperlinks or script actions. These mapped links may provide a site map, or legal information, etc. Such image elements may include very little information of value to the user. For example, the banner image element 310 may be redundant to the user given that a URL is displayed in an address bar of the UI 300 or that the user explicitly requested this web page.

Some web elements may change for each iteration of the web page (e.g., due to a server-side script and database, etc.). However, only some of these web elements may provide the information that the user is really interested in. For example image elements 312 and 312a may show a picture related to the news stories of web elements 316 and 316a, respectively. In various embodiments, these image elements may include stock images (e.g., a flag, picture of a politician, etc.) or specialized images (e.g., picture of a less well known person discussed in the story, an info-graphic, etc.).

Likewise, web elements 314 and 314a may include an image or graphic of the headlines related to the news stories of web elements 316 and 316a, respectively. The information conveyed by these image elements 314 and 314a may be of little or great importance to the user. Web elements 316 and 316a may include static text, such as blurbs or portions of a news story. Web elements 316 and 316a may include a hyperlink to other web pages (e.g., a web page that includes the entirety or a larger portion of the teased news story, etc.).

In one embodiment, the web page of tab 302 may include one or more multimedia or high system resource consumption items. Web element 318 may include a video element (e.g., the HTML Video tag, an embedded video file, etc.). Such a video element may be configured to stream to the apparatus or client device, or be downloaded and cached within the client device. In various embodiments, this may consume system resources, such as bandwidth, memory space, processing power, etc.

In various embodiments, the web page of tab 302 may include one or more elements that are executed by the client device (e.g., a client-side script, compiled executable code, etc.). Web element 320 illustrates an example web element that may make use of AJAX scripting to dynamically change the displayed text and asynchronously request data or information from a server or other remote device. Such a web element 320 may consume system resources, such as bandwidth, memory space, processing power, etc., and, due in part to the dynamic nature of the illustrated element, prove difficult for the client device to compute or determine the impact of the web element 320 on the system resources.

The web page of tab 302 may include one or more advertisements or web elements which point to another web site or server. The web elements may include elements 330 and 330a configured to display image elements. In various embodiments, these image elements may include animated image elements that include a plurality of image elements that are rotated amongst or swapped out over a period of time. In another embodiment, these advertisement image elements 330 and 330a may be relatively small.

The web element 332 may include a plug-in managed web element (e.g., executable code, Flash, Java, etc.). In various embodiments, a plug-in or extension may be a piece of executable code, associated with the web browser or application, which is configured to process web elements in a way differing from or in addition to the processing or rendering provided by the web browser or hosting application. For example, the Adobe Shockwave plug-in may be configured to process Flash executable code or files which the hosting web browser is not configured to process. In various embodiments, a plug-in may enabled or disabled, and the client device may edit or adjust web elements based upon the state (enabled, disabled, installed, etc.) of a plug-in or extension configured to process the web element. Some such web elements may be configured to download additional files or data from a server. Some such web elements may be configured to play or stream videos, audio, or other media. In various embodiments, the client device or web browser may not be configured to analyze the working of the plug-ins or the web elements associated with such plug-ins, and therefore the calculation of the impact by such a web element on the system resources may be difficult or impossible to make. It is understood that the above are merely a few illustrative examples to which the disclosed subject matter is not limited.

It is understood that the above are merely a few illustrative examples to which the disclosed subject matter is not limited. The UI 300 and web page of tab 302 illustrate merely a few sample web page elements which are used to show how the disclosed subject matter may edit or adjust a requested web page. These example elements and their handling by the client device or server are not meant to be definitive, but merely illustrative. Further it is understood that the disclosed subject matter is not limited to a web browser but to any application which requests and receives data in an editable format.

FIG. 4 is a diagram of an example embodiment of a user interface 400 in accordance with the disclosed subject matter. In such an embodiment, the requested web page of tab 302 may be edited or adjusted at least in part to reduce or manage the amount of system resources consumed by displaying, rendering or processing the web page. The resultant edited web page of tab 302 is illustrated in FIG. 4. It is understood that the above is merely one illustrative example to which the disclosed subject matter is not limited.

In one embodiment, the web page elements 310 (the trademarked banner image) may be edited or replaced with a placeholder web element 410. In one embodiment, the client device may determine which elements to edit or replace based upon predefined or historical knowledge. For example, predefined definitions may be in place that state that the element 310 is a banner and may be removed from the web page. Such predefined definitions may be based upon domain names and vary from web site to web site. Conversely, the determination may be based upon rules regarding the size or shape of make-up (e.g., color distribution, etc.) of the image or element. It is understood that the above are merely a few illustrative examples to which the disclosed subject matter is not limited.

In another embodiment, the determination for element 310 or any other web page element may be based upon a set of user preferences. In one embodiment, these user preferences may be compared to explicitly entered user preferences (e.g., entered via an options dialog box or other UI, etc.). In another embodiment, the user preferences may be based upon previous actions or requests for restoration taken by the user, as described above. For example, if the user frequently requests that the banner image of element 310 be restored, the client device may learn this preference and refrain from editing the element 310 in the future or, the client device may lower or raise (as appropriate) the threshold level at which the element 310 is edited or replaced, and so on.

In various embodiments, instead of the user preferences being based upon a user's express actions (e.g., prior restoration requests, explicitly entered preferences, etc.), the user preferences may be based upon the aggregate preferences of a plurality of users. In such an embodiment and further described in FIG. 6, the preferences of a large number of users may be aggregated or averaged to form a baseline set of user preferences. For example, the baseline user preferences may indicate that a certain number of users (e.g., 80% of users) never ask that the element 310 be restored. In such an embodiment, the device may determine whether or not to edit a web page element (e.g., element 310) based upon what the aggregate or baseline user preferences indicate the current user may desire or prefer.

In another example, this current user's preferences may be compared to user preferences of the plurality of users to find a sub-portion of the aggregate users which mostly correlate or match the current user. For example, while 80% of overall users never requested the restoration of element 310, users like the current user requested the restoration 90% of the time, wherein "like the user" may be determined by a predefined rule set and the current user's historical preferences. For example, such rules may include: the currents user's device specifications, the current user's browsing pattern, the current user's demographics, the current user's geographic location, etc. It is understood that the above are merely a few illustrative examples to which the disclosed subject matter is not limited.

In such an embodiment, user preferences, either in the aggregate or regarding the sub-portion of the aggregated users, may influence the determination of whether or not to edit or adjust the element 310. For example, if 90% of users like the current user request the restoration of element 310, the client device may not or may refrain from editing the element 310. It is understood that the above are merely a few illustrative examples to which the disclosed subject matter is not limited. It is also understood that while the use of user preferences has been discussed in relation to element 310 the concept applies to any element of the web page.

In one embodiment, the client device may replace the web page element 310 with a placeholder web page element 412. In the illustrated embodiment, the contents or definitions of the web page elements 310 may be edited or altered to include the placeholder element 410. For example, an HTML IMG tag element configured to display a large complex image from a remote server may be replaced with a placeholder image that is locally available and smaller, such that bandwidth and power are conserved. In other embodiments, the web element (e.g. web page element 318) may be replaced in its entirety. It is understood that the above are merely a few illustrative examples to which the disclosed subject matter is not limited.

Further, in some embodiments, the client device may download and cache the replaced element or its contents (e.g., an image file, etc.) or may refrain from downloading the replaced element, as described above. In some embodiments, the decision to download and cache, but not to display, versus the decision to refrain from downloading the replaced element may be based upon the user preferences (whether aggregated, individualized, or a combination thereof). For example, if the client device determines that a user is likely to request the restoration of the edited web page element, but system resources are very low, the client device may edit the element to include a placeholder element but download (in whole or part) the original element or its contents to have available if needed. An illustrative example of this may include a video, which may be edited or replaced, but which the client device may buffer or cache a portion of such that system resources are not committed to the entire replaced element but only a fraction and the video may still be quickly available to the user if its restoration is requested. Although, it is understood that the above is merely one illustrative example to which the disclosed subject matter is not limited.

In various embodiments, the placeholder elements (e.g. elements 410 or 412, etc.) may include an indication 414 (e.g., an icon, badge, etc.) that informs the user what type of element has been replaced (e.g., image, video, script, etc.) and/or how much or what type of system resources are being saved or conserved by the editing, removal or replacement of the element.

In some embodiments, the web page or element edited or adjusted may include an alternate means of rendering the element. For example, an image mapped graphic (e.g., element 322) which includes hyperlinks based upon the place within an image where the user clicks, may be replaced with static text based hyperlinks (element 416). The original element 322 may indicate that this alternate representation of the element exists, but is not preferred. The client device may alter or edit the element 322 to use the alternate form or representation instead of the preferred form or representation. Such alternate forms may include fields within the element or additional files that may be retrieved from the server. The client device may be configured to select none of these possible forms or representations provided by the original element 322 and instead replace the element 322, as described above.

In one embodiment, the client device may have determined that elements 314, 316, 314*a*, 316*a* are not to be replaced. In such an embodiment, the client device may determine that the use of system resources involved with these elements 314, 314*a*, 316, and 316*a* is either acceptable, that the elements are likely to include user desired information (e.g., contain the news story which the user might want to read, etc.), or based upon user preferences will be restored. In such an embodiment, the client device may display the elements 314, et al. in their original or substantially unedited form.

In various embodiments, the elements of the web page may include tags or fields which may aid the client device in the determination of important or desired information. For example, the elements 314 and 314*a* may include a tag or field that indicates that they include information of importance to the elements 316 and 316*a*, respectively. The tags or fields may have various levels of granularity, for example, a tiered system of importance (e.g., high importance, normal importance, low importance, etc.), a system of associated elements (e.g., elements 314 and 316 being tagged with the same tag, e.g., "news story #1", etc.), or a system of categories (e.g., "advertisement", "boilerplate", "story body", "story graphics", etc.), although it is understood that the above are merely a few illustrative examples to which the disclosed subject matter is not limited.

In some embodiments, the client device may edit the elements 314 et al. slightly in a way that does not materially affect the desired information contained in the element. For example, animated images may not be animated or may rotate amongst the included plurality of images, animated images may transition between images more slowly, special effects (e.g. dancing or blinking text, etc.) may be disabled, etc. It is understood that the above are merely a few illustrative examples to which the disclosed subject matter is not limited.

In one embodiment, the elements 312 and 312*a* may be replaced with placeholder elements 412. In such an embodiment, the client device may have determined that the saving in system resources was worth the replacement or editing, even though the client device may have detected that the elements 312 and 312*a* were associated with the non-replaced elements 316 and 316*a* (e.g., via an element tag or field, a predefined association rule, etc.). In various embodiments, the association between elements may be indicated via a set of predefined rules. As described above, the client device may determine that the user has not or infrequently requests the restoration of the removed elements if they are removed. It is understood that the above are merely a few illustrative examples to which the disclosed subject matter is not limited.

Likewise, elements 330, 332, and 330*a* may also be edited or adjusted, for example with placeholder elements. As described above, these elements 330, 332, and 330*a* may include therefore, the decision to edit or replace the elements may be based upon keywords associated with the elements (e.g., a domain path, the word "advert" in the path respective element's fields, etc."). In another embodiment, the determination may be based upon the type of element or type of media included or employed by the element. For example, the element 332 may include precompiled executable code (e.g., a Flash file, etc.). The client device may not be able to estimate sufficiently the system resource usage of such an element type. However, the client device may be configured to edit or remove such files, based upon predefined rules or user preferences, etc. Or, the client device may be configured to base the system resource usage or savings determination based upon a defined average use of system resources (e.g., based upon a history of the element type, a predefined value, etc.). In another embodiment, the client device may allow the element 332 to be displayed in an un-altered fashion, but later edit or remove the element 332 once a certain amount of system resources have been consumed by the element 332. It is understood that the above are merely a few illustrative examples to which the disclosed subject matter is not limited.

As described above, in various embodiments, the user may indicate that one or edited or removed elements be restored. In one embodiment, this may be as simple as clicking on the placeholder image or icon for the element or right-clicking and selecting the request from a pop-up menu. In various embodiments, a confirmation action (e.g., a dialog box) may be presented to the user to confirm that the user wishes to expend the system resources the restored element is expected to consume.

In such an embodiment, the client device may be configured to then re-edit to displayed web page to include the restoration of the requested element. This newly edited web page may be displayed (in whole or part) to the user. In some embodiments, the edits may have included conditional scripting, as described above, allowing the web page to dynamically alter the elements shown based upon the conditional scripts. For example, a user may wish to view the video element 318. The user may click on the placeholder image 412 included by the edited element 318. In response, the client device may re-edit the web page, restoring the original video element 318 (see in FIG. 3) and display the newly edited web page to the user. Alternately, a conditional script may detect the user's request and switch from displaying the placeholder image to displaying the original video. In some embodiments, this editing and re-displaying may include downloading one or more elements or files from the server. In another embodiment, the non-displayed or original elements, files or data may be cached within the client device.

In various embodiments, during the re-editing process the status elements of the web page may be reevaluated based upon any updated system resource conditions. For example, if system resources have increased since the first editing of the web page, more original elements may be displayed. Conversely, if the system resources have remained the same or lower, the additional usage caused by restoring the requested element may cause previously un-altered elements to be edited or removed. In yet another embodiment, the requested element may simply be restored without affecting other elements and the concern given to the use of system resources overridden by the user's request. It is understood that the above are merely a few illustrative examples to which the disclosed subject matter is not limited.

It is understood that while the same placeholder elements 410 and 412 are shown for the replaced elements (e.g., elements 312 and 318) a variety of placeholder elements may be employed. The section of which placeholder element to employ may be based upon the type of element being edited (e.g., video, image, script, etc.), the system resource saved or conserved by replacing the element, or other considerations.

In one embodiment, the client device may have detected that active web elements 318 and 320 may have consumed too much of one or more system resources. As described above, this determination may be based upon a web page element's expected use of a given system resource and whether or not that expected use would exceed a predefined threshold. In another embodiment, the determination may be based upon a target threshold by which the web page's system resource use is to be reduced (e.g., 80% bandwidth reduction, etc.). In yet another embodiment, the web elements may be identified for alteration or editing based upon web page element type (e.g. video, AJAX or other dynamic script, etc.). It is understood that the above are merely a few illustrative examples to which the disclosed subject matter is not limited.

In such an embodiment, the client device may replace the web page elements 318 and 320 with a placeholder web page element 412. In the illustrated embodiment, the contents of definitions of the web page elements 318 and 320 may be edited or altered to include the placeholder element 412. For example, an HTML Video tag element configured to automatically download and play a video may be edited to only download and play the video when manually requested by the user, such that bandwidth and power are conserved until the user specifically requests their use. A script may be edited to refrain from executing until a user manually requests the script's execution (e.g., an If-Then statement displaying the placeholder element until the user selects the placeholder element and then the original script executes, etc.). In other embodiments, the web element (e.g. web page element 318) may be replaced in its entirety. It is understood that the above are merely a few illustrative examples to which the disclosed subject matter is not limited.

Figure 5:
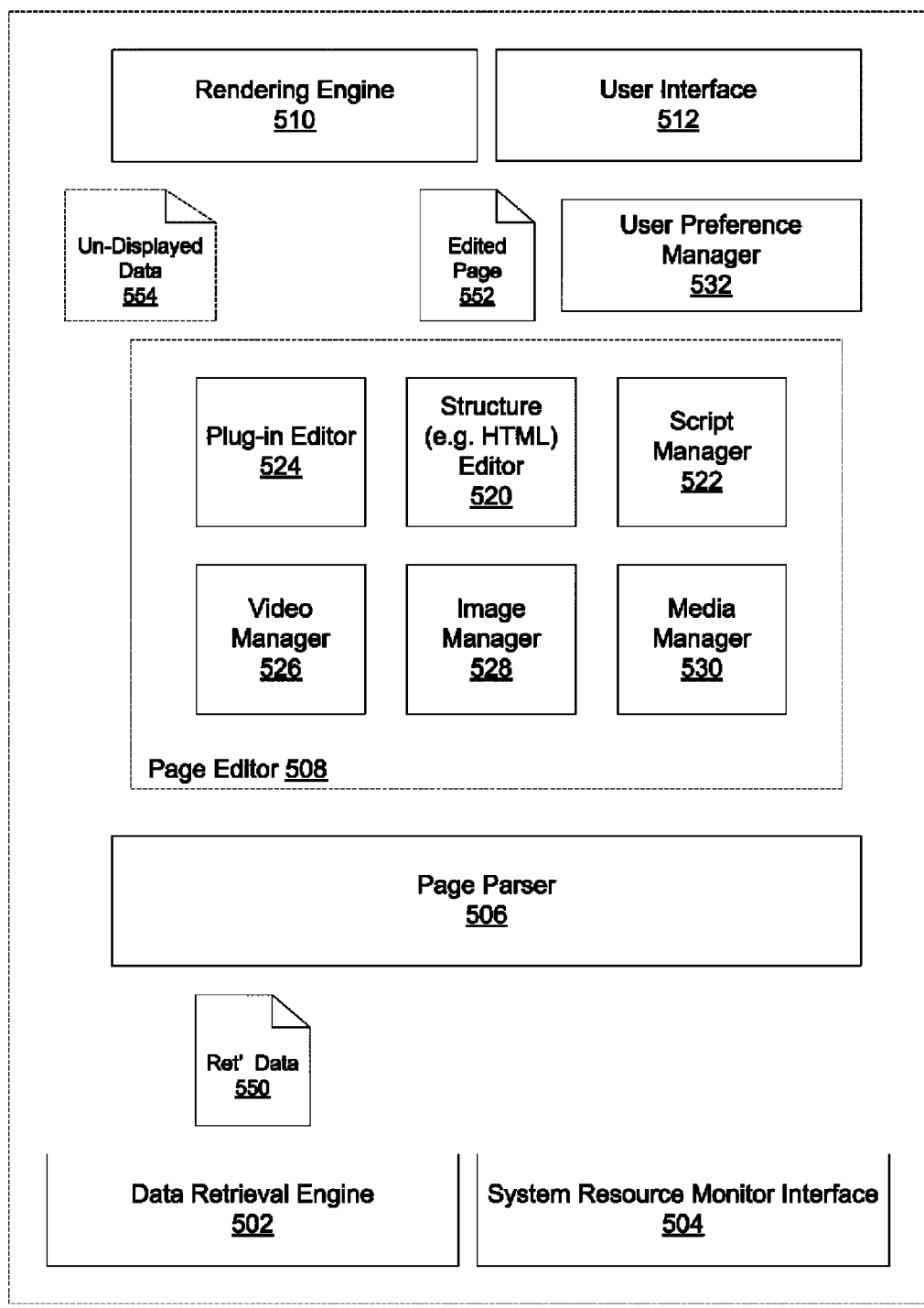
FIG. 5 is a block diagram of an example embodiment of an apparatus in accordance with the disclosed subject matter.

FIG. 5 is a block diagram of an example embodiment of an apparatus 500 in accordance with the disclosed subject matter. In one embodiment, the apparatus 500 may include an operating system and applications (e.g., a web browser). In various embodiments, some or all of the apparatus 500 may be embodied in hardware, firmware, software, or a combination thereof.

In one embodiment, the apparatus 500 may include a data retrieval engine 502 configured to request and receive data 550 from another device or other component coupled with the apparatus 500 (e.g., a memory of a larger apparatus). The received data 550 may include a requested web page, a portion of a requested web page, or a file associated with the requested web page (e.g., an image file, a portion of a video stream, a script file, etc.).

In one embodiment, the apparatus 500 may include a system resource monitor interface 504. The system resource monitor interface 504 may be configured to interface or send and receive messages to and from a system resources monitor. In some embodiments, more than one system resource monitor may exist. The system resource monitor interface 504 may be configured to provide information to the rest of the apparatus 500.

In some embodiments, the system resource monitor interface 504 may be configured to provide information or a message to a remote server, wherein the message includes an indicator related to the level of one or more system resources of the apparatus (e.g., an indication of a type of web page requested, fields and values representing the amount of system resources, etc.). The use of such an indicator is described in more detail in regards to FIGS. 11, 12, 13, and 14 below.

In various embodiments, the apparatus 500 may include a page parser 506 configured to parse or analyze the structure and contents of a received web page 550. In one embodiment, a structural representation of the web page (e.g., a HTML page, etc.) may be analyzed by the page parser 506 to determine which additional data 550 need to be requested or received from a server or providing device (e.g., memory 214 of FIG. 2). In one embodiment, the elements included in the structural representation of the web page may be edited prior to performing any additional data requests regarding the web page. In another embodiment, the data retrieval engine 502 may request additional data associated with the web page prior to or during the competition of the editing of the web page. As described above, such received but unused data, due to an element's removal from the edited web page, may be cached or discarded.

In one embodiment, the apparatus 500 may include a page editor 508. The page editor 508 may be configured to dynamically edit the requested web page, or portions thereof, based upon the monitored system resources, as described above. In various embodiments, editing or adjustment decisions may be further guided by data provided by the user preference manager 532, as described below.

In various embodiments, the page editor 508 may include a variety of sub-modules each configured to process and edit a different type of web page element. In other embodiments, the sub-modules may be less defined by the type of element and more defined by another way of defining the process of page editing, for example a pipelined approach, although it is understood that the above is merely one illustrative example to which the disclosed subject matter is not limited.

In some embodiments, the page editor 508 may include a structure editor 520 configured to determine, edit and alter the structure of the received web page. In various embodiments, the structure may be defined via an HTML, XHTML, Extended Markup Language (XML), JavaScript Object Notation (JSON), etc. format. The Structure editor 520 may be configured to remove or add elements that define the stricture of the received web page 550. In another embodiment, the structure editor 520 may coordinate the additional element type based sub-modules by sending and receiving elements to and from the sub-modules.

The page editor 508 may include, in one embodiment, a plug-in or extension editor 524 configured to edit, adjust, remove or replace web page elements associated with a plug-in or extension. In various embodiments, this may include elements that include precompiled executable code. In another embodiment, editing may include altering fields or values passed to the plug-in or extension, which may alter the way the plug-in processes the data contained in the element. In yet another embodiment, the plug-in editor 524 may monitor the amount of system resources consumed by a plug-in element and remove or replace the element once a certain amount of system resources have been consumed, as described above. It is understood that the above are merely a few illustrative examples to which the disclosed subject matter is not limited.

In various embodiments, the page editor 508 may include a script manager 522. The script manager 522 may be configured to alter, edit, or remove client-side scripts included by the requested web page 550. As described above, this may include altering timers or counters and changing the refresh rate of various script actions (e.g., requesting data, special effects, etc.), expanding user collapsible information, etc. In another embodiment, the script manager 522 may be configured to provide wrapper scripts which conditionally turn off or replace edited, replaced, or removed elements (e.g., via an If-Then statement, etc.), as described above.

In some embodiments, the page editor 508 may include a video manager 526. The video manager 526 may be configured to edit web page elements associated with video files (e.g., the HTML5 Video tag, the HTML EMBED tag, a video plug-in, etc.). In various embodiments, the video manager 526 may be configured to manage the data associated with a video element. For example, the video manager 526 may dictate that the associated data of a removed video element not be downloaded or retrieved. Alternately, the video data may be cached in part and not downloaded in part, or downloaded and cached even if the video element was removed or edited to no longer require the video data (e.g., un-displayed data 554), etc. It is understood that the above are merely a few illustrative examples to which the disclosed subject matter is not limited.

In one embodiment, the page editor 508 may include an image manager 528. The image manager 528 may be configured to edit web page elements associated with image files (e.g., the HTML5 Canvas tag, the HTML IMG tag, etc.), as described above. As with the video manager 526, the image manager 528 may be configured to manage the data and files (e.g., a JPEG file, a WebP file, etc.).

In some embodiments, the page editor 508 may include a media manager 530. The media manager 530 may be configured to edit web page elements associated with media, or as it is sometimes called "rich media" (e.g., video, audio, animation, etc.), as described above. In some embodiments, the media manager may include the video manager 526, the image manager 528, and other specialized media managers (e.g., an audio manager (not shown), etc.). The media manager 530 may also manage the data associated with media elements, as described above.

In various embodiments, the page editor 508 may be configured to produce or generate the edited web page 552. In some embodiments, the page editor 508 may produce portions of the edited web page, in which case the page editor 508 may produce edited data 552. This data or web page 552 may be provided to the rendering engine 510.

In one embodiment, the apparatus 500 may include a rendering engine 510. The rendering engine 510 may be configured to display or format for display the edited web page 552.

The apparatus 500 may also include a user interface (UI) 512 configured to facilitate the interaction between the user and the apparatus 500. In some embodiments, the UI 512 may be produced by the rendering engine 510. Via the UI 512, the user may request the web page or request restoration of edited, removed, or replaced elements. As described above, the page editor 508 may be configured to re-edit the web page, producing a second version of the edited web page 552, according to the user's wishes.

The apparatus 500 may include a user preference manager 532. In various embodiments, the user preference manager 532 may be configured to manage the collection and retrieval of the user preferences. The user preference manager 532 may be configured to acquire or retrieve a set of user preferences to be input into the page editor 508. As described above, these user preferences may be acquired locally or may be acquired from a remote device, as discussed in more detail in regards to FIG. 6. In various embodiments, the user preferences may include an aggregation of user preferences, a set of user preferences associated with the current user of the device or apparatus, or a combination thereof.

In one embodiment, the user preference manager 532 may be configured to monitor, record, and store user requests for the restoration of edited, removed, or replaced elements or content, or user changes to predefined settings (e.g., via a preferences dialog box, etc.). In various embodiments, this data may be stored locally. In another embodiment, these user preferences may be stored remotely, as discussed in more detail in regards to FIG. 6.

Figure 6:
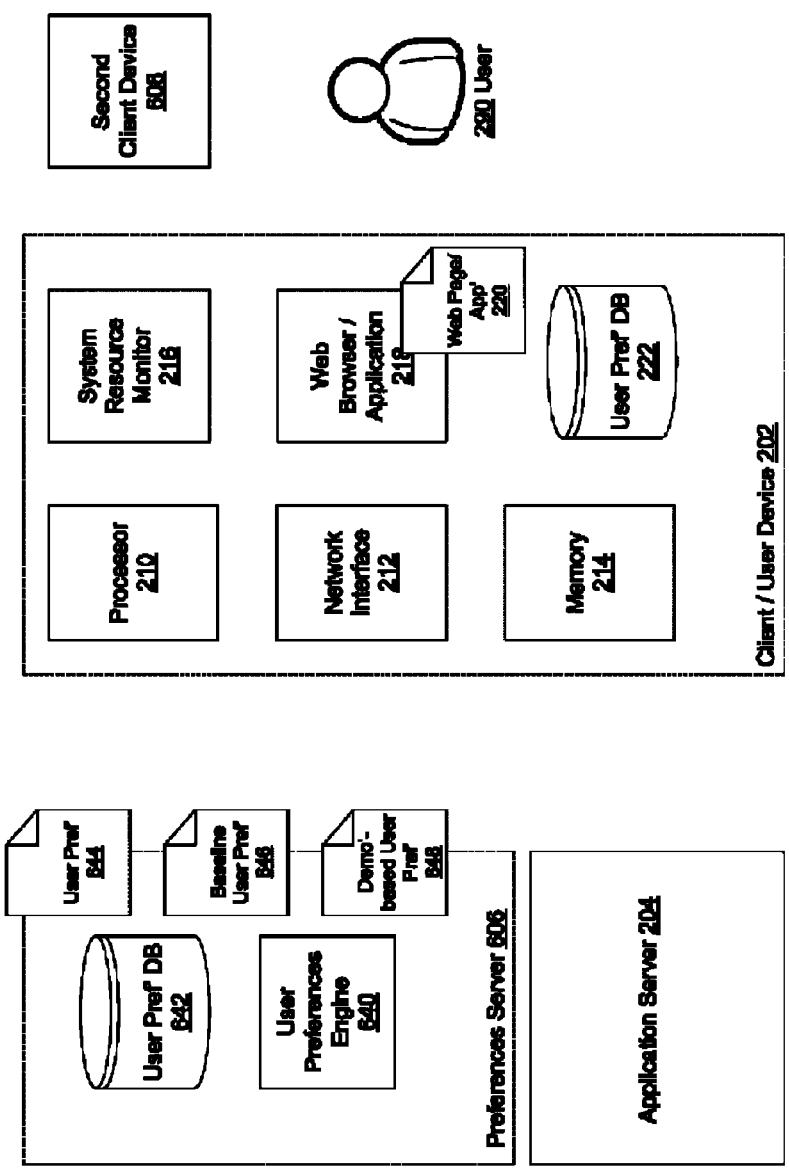
FIG. 6 is a block diagram of an example embodiment of a system in accordance with the disclosed subject matter.

FIG. 6 is a block diagram of an example embodiment of a system 600 in accordance with the disclosed subject matter. In one embodiment, the system 600 may include a client or user device 202, at least one application server 204, and at least one preferences server 606. The client device 202 may be accessed or used by the user 290.

In such an embodiment, one or more user preferences 644 may be stored within a preferences server 606. These user preferences 644 may be accessed by the client device 202. Further, the client device 202 may upload or transmit locally acquired or stored user preferences 644 to the preferences server 606 for storage. In some embodiments, the application server 204 may communicate with the preferences server 606 to acquire or store user preferences 644.

In one embodiment, the preferences server 606 may include a user preferences database (DB) or repository 642.

The user preferences DB 642 may be configured to store user preferences associated with a plurality of users (e.g., user 290). In such an embodiment, the user preferences of a given user (e.g., user 290) may be accessed from a number of devices (e.g., client device 202, second client device 608, etc.). The user 290 may then access their user preferences regardless of the device they are using (assuming the used device may access the preferences server 606). In various embodiments, this may include synchronizing the user preferences 644 across multiple devices (e.g., devices 202 or 608, etc.).

In one embodiment, the user preference information may be stored in an anonymous or a pseudononymous way such that the user preferences 644 may not be easily correlated with a given user (e.g., user 290). In some embodiments involving pseudononymous storage, the accessing device 202 may present a unique identifier or key to access the desired user 290's user preferences 644.

In one embodiment, some user preferences may be stored in an indefinable manner, such that a user 290 may access their own preferences. Such access may require a registration process for the user 290 be completed. However, user preferences 644 may also be stored in an anonymous fashion. In such an embodiment, user preferences of both registered and un-register users may be stored within the user preference DB 644. It is understood that an opt-in or opt-out model may be employed for the collection of the anonymous data, such that user's privacy preferences may be accommodated.

In various embodiments, the preferences server 606 may include a user preferences engine 640. The user preferences engine 640 may be configured to receive and transmit responses to requests for user preference data. Such requests may include requests for a specific user 290's preferences, or requests regarding aggregated user preferences, as described above, although it is understood that the above are merely a few illustrative examples to which the disclosed subject matter is not limited. Further, the user preferences engine 640 may be configured to receive incoming user preference data for storage within the user preference DB 642.

In some embodiments, the user preferences engine 640 may be configured to process the plurality of stored or incoming user preferences to determine an aggregate "average" or baseline set of user preferences. As described above, such a baseline set of user preferences 646 may be employed by the client device 202 or other receiving device to determine which elements of a requested web page should be edited or adjusted. These baseline set or aggregated user preferences 646 may be employed by the receiving device (e.g., devices 202, 204, 608, etc.) if a web page has been requested that the actual user 290 does not have a set of user preferences for. In such an embodiment, the receiving device may edit the requested web page based upon the preferences of a fictional "average" user as defined by the baseline or aggregated user preferences 646, as described above. As described above, the baseline set of user preferences may be based upon a sub-portion of the users that are similar to the current user. Such personalized user preferences are described in more detail below.

In various embodiments, the user preferences engine 640 may be configured to process the plurality of stored or incoming user preferences to determine a personalized set of user preferences 648 based upon a given user (e.g., user 290). In such an embodiment, the user preferences engine 640 may be informed that a user 290 wishes their user preferences. In addition to the user's own preferences 644, the user preferences engine 640 may prepare or have prepared a personalized set of baseline user preferences 648. The personalized preferences 648 may be computed not by looking at all of the users aggregated in the user preference DB 642, but by only a subset of the users which correlate with the user 290. In various embodiments, correlation may be determined by, for example, by demographics, by the correlation of the user 290's preferences with other users' preferences, or via other techniques; it is understood that the above are merely a few illustrative examples to which the disclosed subject matter is not limited. The personalized user or user preferences 648 may be employed by the receiving device (e.g., device 202, etc.) in the same manner as the baseline user preferences 646, as described above.

As described above, the client device has generally determined the level of system resource usage for each web element. In one embodiment, the client device may monitor the level of system resource usage of an entire tab, web page, or application. In such an embodiment, the system resource usage of the tab, web page, or application may be displayed to the user.

FIG. 7 is a diagram of example embodiments of user interfaces (UIs) 701 and 702 in accordance with the disclosed subject matter. As discussed in connection with FIG. 6, the client device may determine the level of system resource usage. In such an embodiment, a monitoring application may display the system resource usage of various tabs, web pages, or groups thereof. In the illustrated embodiment, the monitoring application is illustrated as a special tab or a web application, but it is understood that the above is merely one illustrative example to which the disclosed subject matter is not limited.

To help a user or other program optimize system resources (e.g., battery life, etc.) a client device can provide a system resource metering application such as that shown by UIs 701 and 702. The metering application may provide information indicating the amount of system resources (e.g., power, bandwidth, etc.) currently being drawn from the device (e.g., battery, etc.), and the drains (e.g., applications, web pages, tabs, etc.) that are currently consuming those system resources.

In one embodiment, shown in UI 701, the metering application 700 displays a list 710 of web applications running on the client device, and a histogram 720 disclosing how much system resources (e.g., power, etc.) each web application is currently consuming. In an alternative embodiment, shown in UI 702, the metering application 700 displays a list of browser tabs 760, and a histogram 770 disclosing how much system resources each tab is currently consuming.

The system resource metering or monitoring application 700 embodiment shown in UI 702 may be useful for client devices where the user principally uses a tab-based browser to interact with the Internet, intranet or "cloud." For example, UI 702 shows a user who has four tabs opened in their browser: CNN™, ESPN™, DISNEY™ and GMAIL™, for example. In the illustrated embodiment, the DISNEY™ tab, which may be receiving and processing a DISNEY™ video stream, is drawing the most power. In the illustrated embodiment, the monitored and displayed system resource may be operational power (e.g., from a battery, or wall electrical outlet, etc.). The CNN™ and ESPN™ tabs, which may receive periodic news and sports feeds from the CNN™ and ESPN™ websites, respectively, are drawing about the same amount of power, but less power than the DISNEY™ tab. Finally, the GMAIL™ tab, which is displaying the user's email program, may be drawing the least amount of power as it is largely in a quiescent state, waiting for email messages to arrive or for the user to review old email messages or compose new ones.

Likewise, 700 embodiment shown in UI 701 may be useful for client devices where the user principally uses a task based applications to interact with the Internet, intranet or "cloud." For example, UI 701 show a user who has three web applications open: an email client, an internet chat client, and a media player. In various embodiments, each web application may occupy one tab of a web browser, although it is understood that the above is merely one illustrative example to which the disclosed subject matter is not limited. In the illustrated embodiment, the monitored and displayed system resource may be network bandwidth consumption (e.g., from a cellular network or a wireless local area network (WLAN), etc.). The media player web application, which may be streaming a video, may display the greatest amount of network bandwidth usage. The chat web application, which may transmit and receive many small messages, may display a medium amount of network bandwidth usage. The email web application, which may receive larger messages but with a much lower frequency, may consume the least amount of network usage.

In various embodiments, the monitoring application 700 may display various degrees of usages granularity. For example, tabs or applications may be grouped together (e.g., tab groups, etc.), the system resource usage of windows, virtual desktops, or other UI elements may be monitored and displayed. It is understood that the above are merely a few illustrative examples to which the disclosed subject matter is not limited.

The metering application 700 can display the client device's current system resource usage in any number of ways, such as a histogram as shown in UIs 701 or 702, a pie chart, as a numerical value, etc. It is understood that the above are merely a few illustrative examples to which the disclosed subject matter is not limited. In various embodiments, the monitoring application 700 may display each application or tab's power draw in absolute terms (e.g., in watts or some other measure of system resources), or in relative terms (e.g., as a percentage of the total system resource consumption).

In various embodiments, one or more system resources and their respective usage may be displayed by the metering application 700. In one embodiment, the metering application 700 may be configured to monitor and display the power consumption of the tabs or application, for example. In another embodiment, multiple system resources may be displayed and monitored. For example, the power usage and the bandwidth or network usage of the tabs or applications may be monitored. It is understood that the above are merely a few illustrative examples to which the disclosed subject matter is not limited.

Further, it is understood that the client device may monitor more system resources than are displayed within the monitoring application 700. In various embodiments, these un-displayed system resources may still employed for purposes of editing requested web pages, as described above.

The amount of system resources (e.g., power) currently being drawn from the client device or sub-component thereof (e.g., battery) by each tab may be determined in a number of ways. For example, the power draw can be determined and displayed as the instantaneous power draw (e.g., by measuring the actual power draw at a given instant of time, etc.). To measure the power draw from the battery necessary or estimated to run each web application or tab, the total power draw from the battery can be multiplied by the fractional amount of time each application or tab is granted processor cycles or other system resources such memory accesses. Other means of measuring or estimate other system recourse consumption may be employed.

While measuring the instantaneous system resource (e.g., power, etc.) draw of each web application or tab may be suitable for web applications or tabs that draw a relatively constant amount of system resources, it may be less suitable for web applications or tabs that have highly variable system resource usage. For such web applications or tabs, it may be more appropriate to determine and display the power draw as the average amount of system resources over some meaningful period of time (e.g., 1, 10, 30 or 60 minutes, etc.). In yet another embodiment, it may be appropriate to display some historically determined measure of the average system resource consumption associated with that web application or tab. The historically determined measure may be obtained, for example, from a prior histogram of that web application or tab's instantaneous system resource draw over the previous lifetimes of the web application or tab.

In one embodiment, to determine a web application or tab's historical system resource consumption, the operating system or browser may create a system resource consumption histogram for every new web application, tab or web page that is opened. The client device may then periodically measure the instantaneous system resource consumption of the application or tab, and populate the histogram with that measurement. Statistical information from that histogram (e.g., its mean or median value, together with its standard deviation, etc.) or other measurements of the system resource consumption distribution may be used to determine the web application or tab's system resource consumption.

In various embodiments, to keep the histogram or other measure of system resource consumption current, an aging factor may be employed. For example, in one embodiment the data that is less than a certain age (e.g., less than 1, 2 or 3 hours old, etc.) may be used to populate the histogram. In one embodiment, when the web application or tab is closed, the histogram and its contents may be destroyed. In another embodiment, the histogram and its contents can be saved and opened and added to when the same web application or tab (e.g., pointing to the same URL, etc.) is opened in the future.

Figure 8:
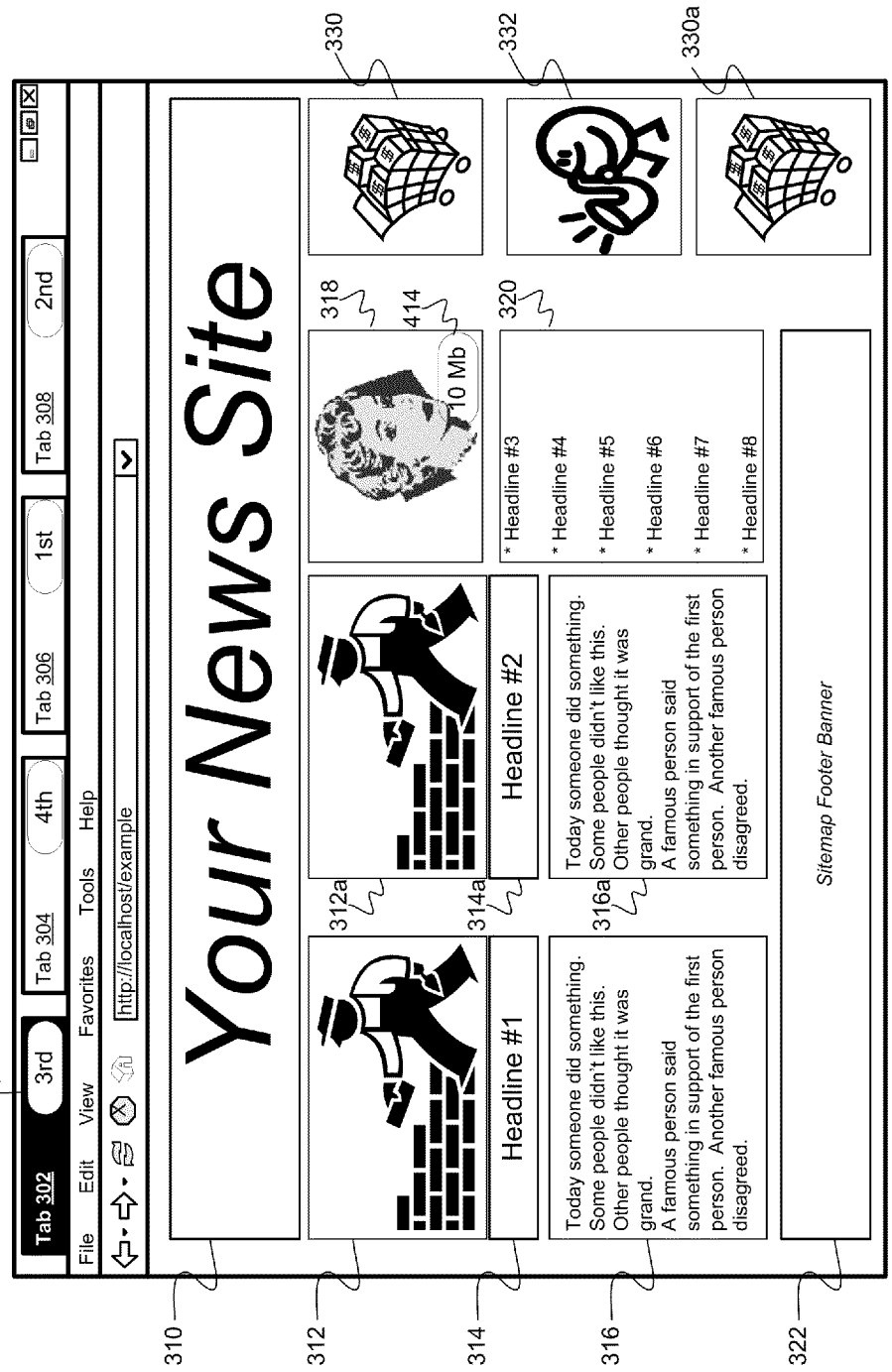
FIG. 8 is a diagram of an example embodiment of a user interface in accordance with the disclosed subject matter.

FIG. 8 is a diagram of an example embodiment of a user interface 800 in accordance with the disclosed subject matter. As discussed in connection with FIG. 7, the client device may display information regarding the amount of system resource usage of each tab or web application, etc. In the illustrated embodiment of FIG. 8, the requested web page of tab 302 and the tabs 304, 306, and 308 of FIG. 3 are again illustrated. In the illustrated embodiment, the monitoring application may be displayed not as a special tab or web application, but integrated within the tabs 302, 304, 306, and 308 themselves. It is understood that the above is merely one illustrative example to which the disclosed subject matter is not limited.

In the illustrated embodiment, the display 810 of the level of consumed system resources may directly one the individual tabs (e.g., tabs 302, 304, 306, and 308). In one embodiment, the display of the system resource consumption of each tab may be shown as a rank (e.g., $1^{st}$, $2^{nd}$, $3^{rd}$, ect.). In another embodiment, the display of system resource consumption may be shown as a bar graph, color code, numerical value, etc. As described above in reference to FIG. 4, in various embodiments the client device may also display 414 the amount of system resources consumed for each web element (e.g., web element 318, etc.).

In various embodiments, a user or program (e.g., the web browser, etc.) may use the information displayed by metering application to optimize system resource usage. For example, a user may decide to close tab 306 of FIG. 8 to conserve resources. In another embodiment, the user or client device may conserve battery life by closing or throttling web applications or browser tabs that are not currently needed or that draw too much power. It is understood that the above are merely a few illustrative examples to which the disclosed subject matter is not limited.

Figure 9:
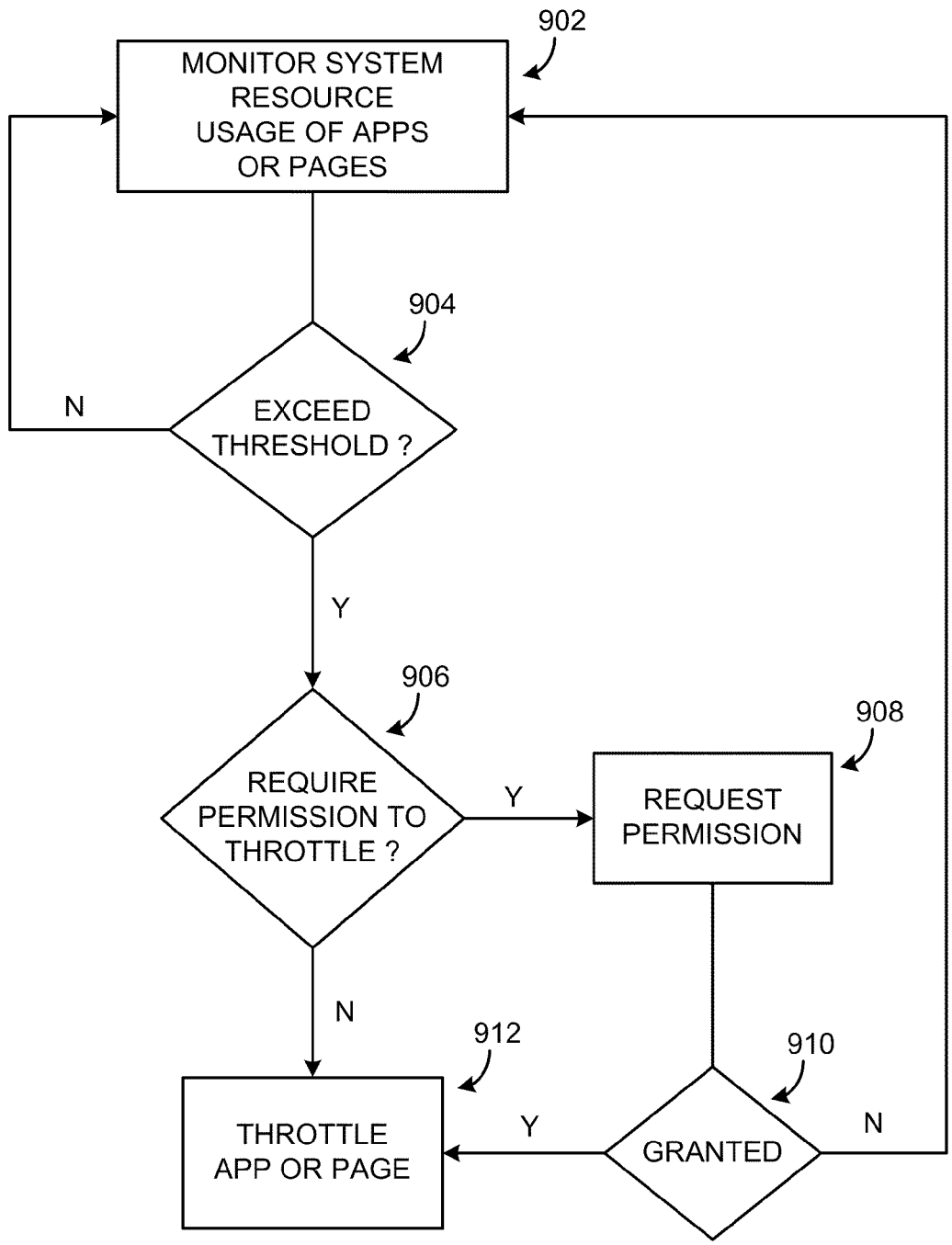
FIG. 9 is a flowchart of an example embodiment of a technique in accordance with the disclosed subject matter.

FIG. 9 is a flowchart of an example embodiment of a technique 900 in accordance with the disclosed subject matter. As discussed in connection with FIGS. 3, 4, 5, and 6, the client device may in the illustrated embodiment, in addition to displaying the system resource usage of various web applications or tabs, the client device may execute an application throttling process that monitors the system resource usage of the web applications or tabs that are running on the client device, and potentially throttles those web applications or tabs. It is understood that the above is merely one illustrative example to which the disclosed subject matter is not limited.

Block 902 illustrates that, in one embodiment, such a throttling process may include monitoring the system resource usage (e.g., operating power draw, etc.) of all web applications or tabs running on the platform, as described above. In various embodiments, this may include monitoring the output of the metering application.

Block 904 illustrates that, in one embodiment, the throttling process may then determine if any of the web applications or tabs exceed a threshold. In various embodiments, the threshold may be a constant or a function of the estimated system resources (e.g., operating power, etc.) left for the client device (e.g., in the battery, etc.). In some embodiments, the threshold can be the same for all web applications and tabs, or vary according to the type of web application and tab (e.g., a media player may have a high network usage threshold, a word processor may be threshold limited by operating power, etc.). It is understood that the above are merely a few illustrative examples to which the disclosed subject matter is not limited.

Block 906 illustrates that, in one embodiment, that when the client device identifies a web application or tab that draws more power than its respective threshold, the client device may further determine whether user permission to throttle the web application or tab is required. In various embodiments, the determination of the user permission requirement may be based upon the user's user preferences described above.

Block 912 illustrates that, in one embodiment, if no permission is required, the client device may throttle a system resource hungry web application or tab. In some embodiments, this may involve editing the web application or tab, as described above. In another embodiment, throttling the web application or tab may include, for example, giving the web application or tab a lower execution priority or lower refresh rate, or by otherwise granting it fewer processor cycles or access to system resources, etc. It is understood that the above are merely a few illustrative examples to which the disclosed subject matter is not limited.

Block 908 illustrates that, in one embodiment, if the throttling process does require permission to throttle the system resource hungry web application or tab, the client device may request user permission.

Block 910 illustrates that, in one embodiment, if permission is denied, the client device may continue to monitor the system resource usage of the other web applications or tabs. In another embodiment, the client device may adjust the system resource threshold of that web application or tab. For example, the threshold may be raised to avoid requesting the user's permission to throttle the web application or tab too often. The client device may then continue to monitor the system resource usage of all the web applications or tabs, as described above. It is understood that the above are merely a few illustrative examples to which the disclosed subject matter is not limited.

However, if permission is granted, the client device may throttle the system resource hungry application or tab, as described above.

The throttling process shown in FIG. 9 may throttle the system resource usage of web applications or tabs in a number of ways, depending on the particular web application or tab. For example, the client device may lower the execution priority of a web application or tab, or lower the rate at which an image that the web application or tab displays on screen is rendered or refreshed. For web applications and tabs that rely on network updates or feeds, the throttling process may reduce the frequency with which the web applications and tabs perform those updates or feeds. For applications and tabs that perform a polling function, e.g., for a mail application that periodically polls a mail server, the throttling process can reduce the web application or tab's polling frequency. It is understood that the above are merely a few illustrative examples to which the disclosed subject matter is not limited.

In a specific embodiment, the throttling process shown in FIG. 9 may reduce the power draw of application and tabs by monitoring the processor usage, and controlling the demand the web applications put on the processor in order to entice the processor to enter a lower power state. In doing so, the throttling process may take advantage of innate power management functionality sometimes built into modern processors.

In such an embodiment, the technique may take advantage of processor functionality that allows the processor to run at one of several clock speeds depending on the processing demand. When demand is high, the processor may automatically run at a higher clock speed to meet the demand, thereby providing system responsiveness. Unfortunately, this may cause the processor to draw more operating power from the battery. Conversely, when processor demand is low, the processor may automatically run at a lower clock speed, thereby drawing less power from the battery.

In such an embodiment, by monitoring the processor demand, the throttling process may fine tune the processing demand that the web applications or tabs collectively place on the processor. This in turn may to reduce the operating power draw from the battery. For example, if the processor demand is just above a clock-changing threshold, the throttling process can reduce the demand made on the processor by one or more web applications or tabs just enough to allow the processor to reduce its clock speed. This can be done, for example, by reducing the polling rate of one or more web applications or tabs, or reducing the refresh rate, or reducing the frequency with which network feeds or updates are processed. It is understood that the reduction of the processor power state is merely one illustrative example to which the disclosed subject matter is not limited.

Figure 10:
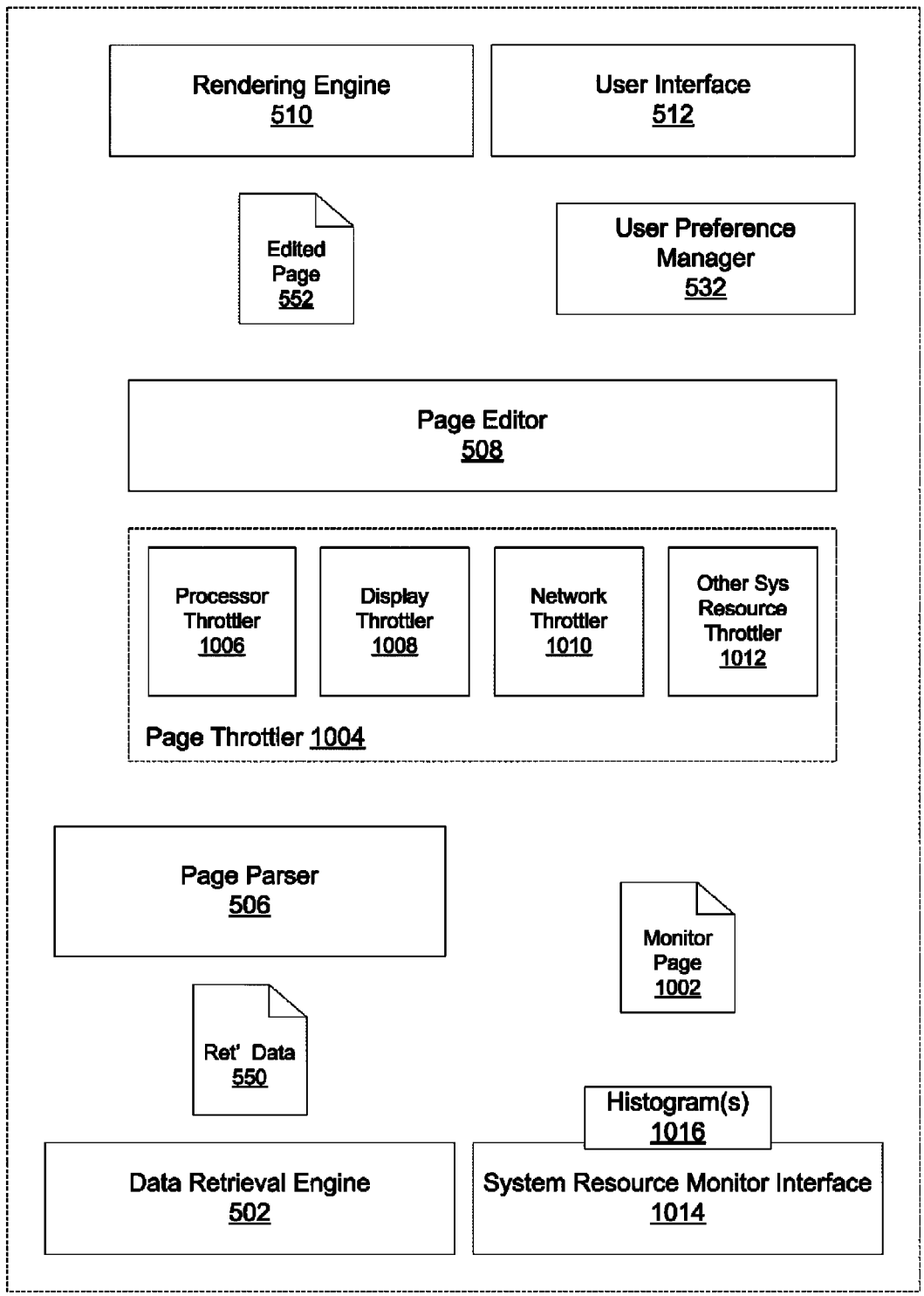
FIG. 10 is a block diagram of an example embodiment of an apparatus in accordance with the disclosed subject matter.

FIG. 10 is a block diagram of an example embodiment of an apparatus 1000 in accordance with the disclosed subject matter. As discussed in connection with FIG. 5, the client device may edit a requested web page to reduce the usage of system resources. As discussed in connection with FIG. 9 a method of throttling may also or alternatively be employed to reduce the use of system resources. In one embodiment, the apparatus 1000 may include an operating system and applications (e.g., a web browser). In various embodiments, some or all of the apparatus 1000 may be embodied in hardware, firmware, software, or a combination thereof.

In various embodiments, the apparatus 1000 may include many of the components of the apparatus 500 of FIG. 5. In addition, the apparatus 1000 may include a page throttler 1004 to throttle web applications, web pages, or tabs, as described above.

In one embodiment, the system resource monitor interface 1014 may monitor the system resources of the client device, as described above. The system resource monitor interface 1014 may also monitor the system resource usage of web applications, web pages, tabs, or other level of system resource monitoring, as described above. In such an embodiment, the system resource monitor interface 1014 may generate, store, and update the system resource usage histograms 1016, as described above.

In various embodiments, system resource monitor interface 1014 may generate a monitor application page 1002. In various embodiments, this monitor application page 1002 may include the UIs 701 or 702 of FIG. 7, as described above. In another embodiment, the system resource monitor interface 1014 may provide information (e.g., a system resource usage value, etc.) to the page editor 508 or rendering engine 510. In such an embodiment, the page editor 508 or rendering engine 510 made display the information to the user (e.g., via badges or icons 810 of FIG. 8). It is understood that the above are merely a few illustrative examples to which the disclosed subject matter is not limited.

In one embodiment, the page throttler 1004 may throttle the processing of web applications, web pages, or tabs, as described above. In various embodiments, the page throttler 1004 may receive web applications, web pages, or tabs system resource usage information from the system resource monitor interface 1014. The page throttler 1004 may compare this system resource usage information to one or more thresholds, as described above. If a particular web application, web page, or tab exceeds the threshold, the page throttler 1014 may attempt to throttle the processing of the respective web application, web page, or tab.

In the illustrated embodiment, the apparatus 1000 includes a page editor 508, as described above. In such an embodiment, the page throttler 1004 may work in conjunction with the page editor 508 to reduce the system resource usage of a web application, web page, or tab. For example, prior to throttling the web application the apparatus 1000 may attempt to edit the web page that includes the web application. If such editing proves insufficient, the web application may then be throttled. In another embodiment, the apparatus 1000 may not include a page editor 508 and may rely on throttling. It is understood that the above are merely a few illustrative examples to which the disclosed subject matter is not limited.

In various embodiments, the page throttler 1004 may include a plurality of sub-components. Each of these sub-components may throttle a separate system resource. For example, the processor throttler 1006 may throttle or adjust the amount of processor execution time a particular web application receives. The display throttler 1008 may reduce or adjust the refresh rate at which a web application (e.g., game, etc.) is displayed. The network throttler 1010 may throttle network communications (e.g., frequency of network updates, polling frequencies, etc.). Other system resource throttler(s) 1012 may be included by page throttler 1004. It is understood that the above are merely a few illustrative examples to which the disclosed subject matter is not limited.

FIG. 11 is a diagram of an example embodiment of a user interface (UI) 1100 in accordance with the disclosed subject matter. As described above in reference to FIG. 2, in some embodiments, the application server (e.g., application server 204 of FIG. 2) may be configured to edit or adjust requested web pages based, at least in part, upon the level of system resources of the client device (e.g., client device 202 of FIG. 2). The illustrated UI 1100 illustrates some of the adjustments that may be made by the application server. It is noted that the UI 1100 shows an adjusted version of the web page shown in FIG. 3.

As described above, the application server may be in a position to make more fundamental adjustments or have more options in the types of adjustments that may be made to the requested web page than a receiving device (e.g., a client device) may have. In such an embodiment, the client device may communicate an indication to the application server or server regarding the level of system resources available on the client device. For example, the client device may inform the server of how mush processing power is available, the level of battery health, etc. In one embodiment, this may include one or more fields and values indicating a resource level for each or some of the monitored system resources.

In another embodiment, the server may provide the client device with a list of available versions of the requested web page and their respective elements or system resource costs. For example, the server may be capable of providing a variety of versions of the requested web page (e.g., a static version of the web page, or an active version of the web page, a page with a first set of features, a page with a second set of features, etc.). The client device may then, based upon the monitored system resources, select or request one of the available versions of the web page. It is understood that the above are merely a few illustrative examples to which the disclosed subject matter is not limited.

In various embodiments, the server may also make adjustments similarly to those shown and described in regards to FIG. 4. However, UI 1100 illustrates further example adjustments which may be made to the requested web page.

In one embodiment, the banner image (element 312 of FIG. 3) may be replaced with a text element 1110. Likewise, with the graphical elements displaying the headlines of the news stories (elements 314 and 314*a* of FIG. 3) that may be replaced with text elements 1114 and 1114*a*, respectively. Also, the graphical image mapped footer banner (element 322 of FIG. 3) may be replaced with a text element 1122 which includes hyperlinks.

In various embodiments, the video elements (e.g., element 318 of FIG. 3) may be removed from the web page. Likewise, the graphical elements showing advertisements (elements 330 and 330*a* of FIG. 3) may be replaced with text element advertisements 1130 and 1130*b*. The executable code element showing the video advertisement (element 332 of FIG. 3) may be replaced with a text element 1130*a*. In various embodiments, the text element advertisements may be for the same of different products as the more system resource intensive graphical and executable code elements of FIG. 3.

In some embodiments, the scripted element (element 320 of FIG. 3) may be replaced with text element 1120. Whereas the scripted element may have included asynchronous data accesses (e.g., data requests to the server), data refreshes, special UI effects, etc., the more inactive text element 1120 may consume a lesser amount of the system resources while providing the user with a similar amount of information.

In some embodiments, various elements (e.g., text elements 316 and 316*a*) may not be adjusted or edited by the server. The server may deem that various elements consume an insignificant or acceptable amount of system resources or provide high value information to the user and are not to be adjusted. As described above, these determinations may be made based upon the indicated level of system resources, such that an acceptable level of consumption of system resources may differ from one scenario to the next.

Figure 12:
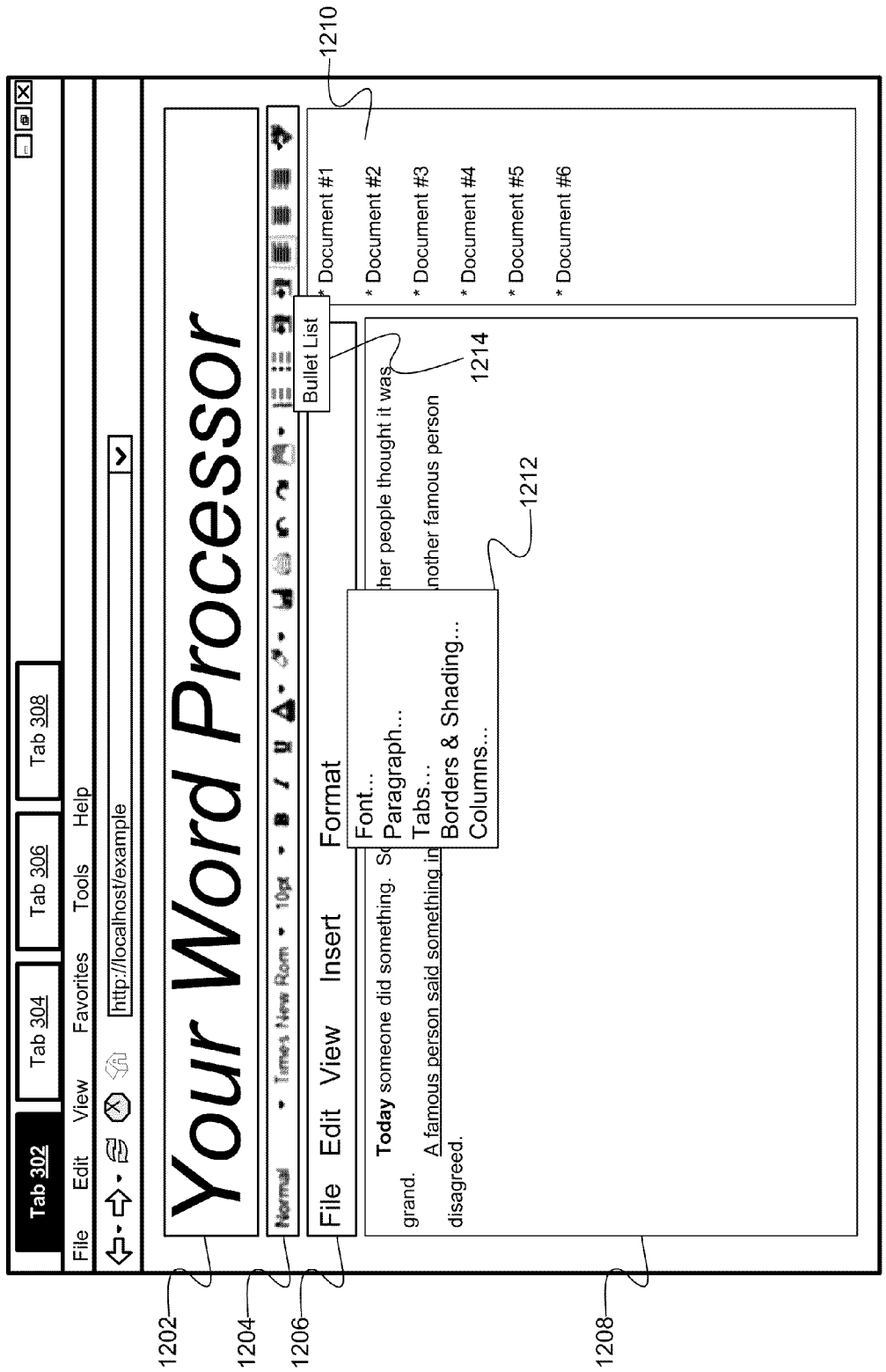
FIG. 12 is a diagram of an example embodiment of a user interface in accordance with the disclosed subject matter.

FIG. 12 is a diagram of an example embodiment of a user interface (UI) 1200 in accordance with the disclosed subject matter. As described above in reference to FIG. 2, in some embodiments, the application server (e.g., application server 204 of FIG. 2) may be configured to edit or adjust requested web pages based, at least in part, upon the level of system resources of the client device (e.g., client device 202 of FIG. 2). The illustrated UI 1200 illustrates a possible web page that may be transmitted to a client device when the client device has an abundance of system resources.

The illustrated UI 1200 illustrates a possible web application. As described above, a web application may include an application that is accessed over a network such as the Internet or an intranet. The term may also mean a computer software application that is hosted in a browser-controlled environment (e.g., a Java applet, etc.) or coded in a browser-supported language (e.g., JavaScript and HTML) and reliant on a common web browser to render the application executable. In the illustrated embodiment, UI 1200 illustrates a word processing web application.

In one embodiment, the UI 1200 may include an image web element 1202 that displays the web application's trademark, name or other identifier. In various embodiments, this web element 1202 may be similar to the banner image web element 310 of FIG. 3.

The UI 1200 may also include a series of buttons or a toolbar web element(s) 1204. In the illustrated embodiment, each of these buttons 1204 may be associated with a client-side script that performs one or more actions on the document enclosed by web element 1208. A particular button and script may be configured to, for example: change the font of selected text, change the size of selected text, bold selected text, save the document (e.g., either locally or to a remote server, etc.), undo a previous action, convert selected text into a bulleted list, change the alignment of the text, etc. It is understood that the above are merely a few illustrative examples to which the disclosed subject matter is not limited. Furthermore, in various embodiments, the buttons 1204 may include or be associated with various special effects 1214 (e.g., mouse-over text, animations, etc.).

The UI 1200 may include a series of menus or a menu bar 1206. Each menu 1212 or sub-menu may include one or more menu items which may be selected by a user. In various embodiments, these menu items may cause an action (e.g., similarly to that of the buttons 1204) to be performed. In another embodiment, one or more of these menu items may result in the creation of a dialog box or other user interface element that allows a user to select more complex actions (e.g., breaking the text of web element 1208 into columns, setting tab stops, etc.).

The UI 1200 may include a document or text web element 1208. In various embodiments, the web element 1208 may include a document being edited by a user. In various embodiments, the web element 1208 may display the text or document being edited in a WYSIWYG (What You See Is What You Get) fashion, which displays the document, while the document is being created, in a manner very similar to the end result which will be, for example, printed or published (e.g., via web page, etc.). As illustrated, some text may be displayed in a bold or underlined format.

The UI 1200 may include a web element 1210 which displays a list of documents or other files associated with the user. In various embodiments, these documents may be stored on a remote server. In another embodiment, these documents may be locally stored. In yet another embodiment, a combination of locally and remotely stored documents may be displayed or made accessible via web element 1210. In some embodiments, the web element 1210 may employ executable code, a plug-in, or a client-side scripts to access these documents and authenticate the user's rights to access these documents. It is understood that the above are merely a few illustrative examples to which the disclosed subject matter is not limited.

Figure 13:
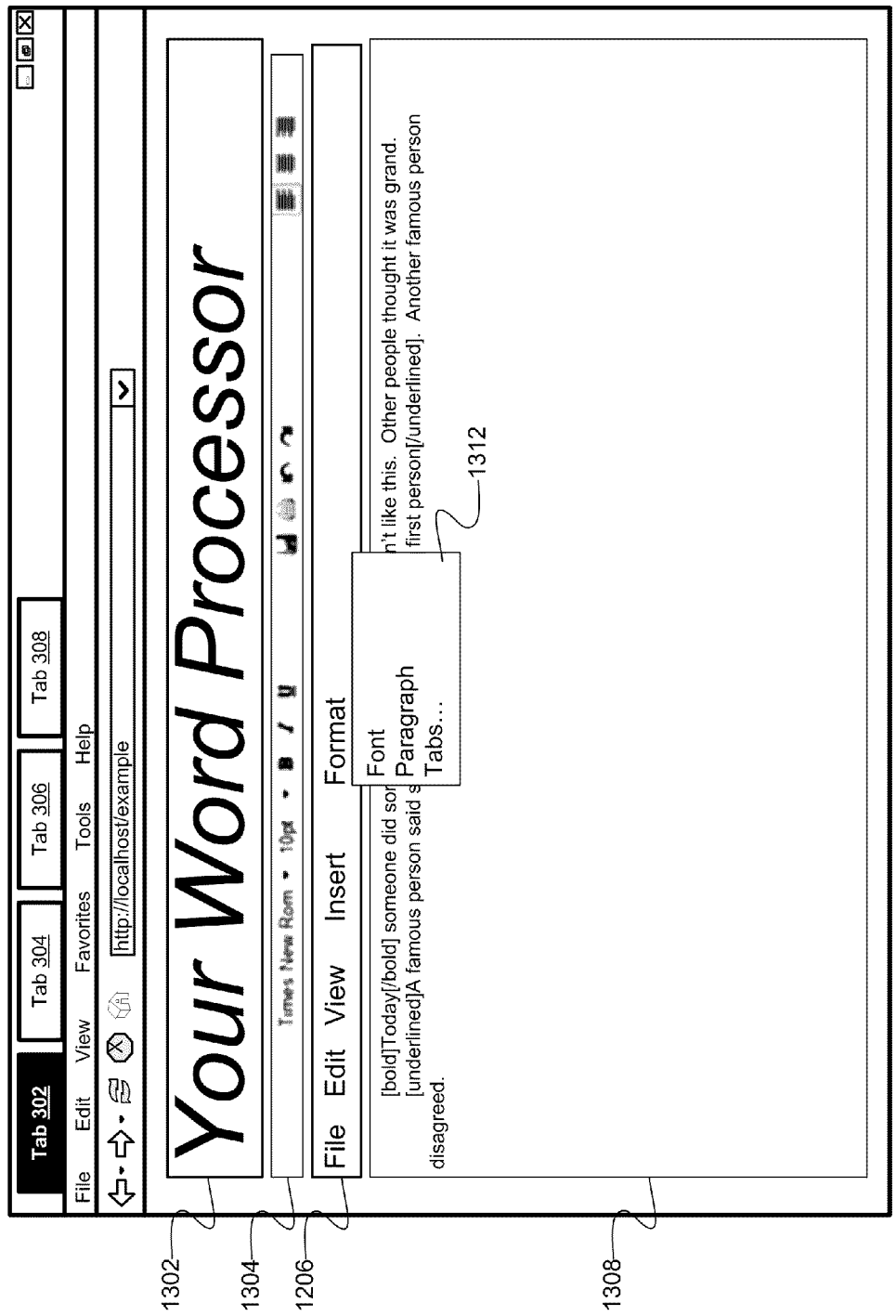
FIG. 13 is a diagram of an example embodiment of a user interface in accordance with the disclosed subject matter.

FIG. 13 is a diagram of an example embodiment of a user interface (UI) 1300 in accordance with the disclosed subject matter. As described above in reference to FIG. 2, in some embodiments, the application server (e.g., application server 204 of FIG. 2) may be configured to edit or adjust requested web pages based, at least in part, upon the level of system resources of the client device (e.g., client device 202 of FIG. 2). The illustrated UI 1300 illustrates a possible web page that may be transmitted to a client device when the client device has a dearth of system resources, and may be contrasted with the UI 1200 illustrated by FIG. 12.

In one embodiment, the image web element 1202 may be replaced with a text web element 1302. This may be similar to the replacement of the banner image web element 310 of FIG. 3 with the text web element 1110 of FIG. 11.

In various embodiments, one or more of the series of buttons or portion of the toolbar 1204 of FIG. 12 may be removed or replaced. In the illustrated embodiment, a number of buttons have been removed from toolbar 1304. The decision concerning which buttons may be removed or altered may be made based upon the amount or type of system resources consumed by the buttons or the actions associated with those buttons. For example, the button associated with text formatting styles (e.g., Normal, Heading-1, etc.), the creation of bulleted lists, etc. may be removed from the toolbar 1304. It is understood that the above are merely a few illustrative examples to which the disclosed subject matter is not limited.

In the illustrated embodiment, the menubar 1206 may include the same menus. However, the individual menus 1312 may have menu items (e.g., borders & shading, columns, etc.) removed, adjusted, or replaced. As described above, the determination of which menu items or menus 1312 to edit or adjust may be based upon the level of system resources possessed by the client device or consumed by the respective menu items, as described above.

In various embodiments, the document selection web element 1210 of FIG. 12 may be removed from the UI 1300. In such an embodiment, the web application of UI 1300 may employ less resource intensive means to open, close or save files (e.g., a system provided dialog box, etc.). In another embodiment, the dynamic web element 1210 of FIG. 12 may be replaced with a static web element, such as web element 1120 of FIG. 11. It is understood that the above are merely a few illustrative examples to which the disclosed subject matter is not limited.

It is understood that, while the web application of FIGS. 12 and 13 have been described within the context of the server-side editing and adjustment of web pages, in some embodiments web applications and the web pages that include the web application may be edited by the client device. In such an embodiment, the client device may dynamically edit or adjust the web page or associated scripts, etc. as described above. It is also understood that the above is merely one illustrative example of a web application to which the disclosed subject matter is not limited.

Figure 14:
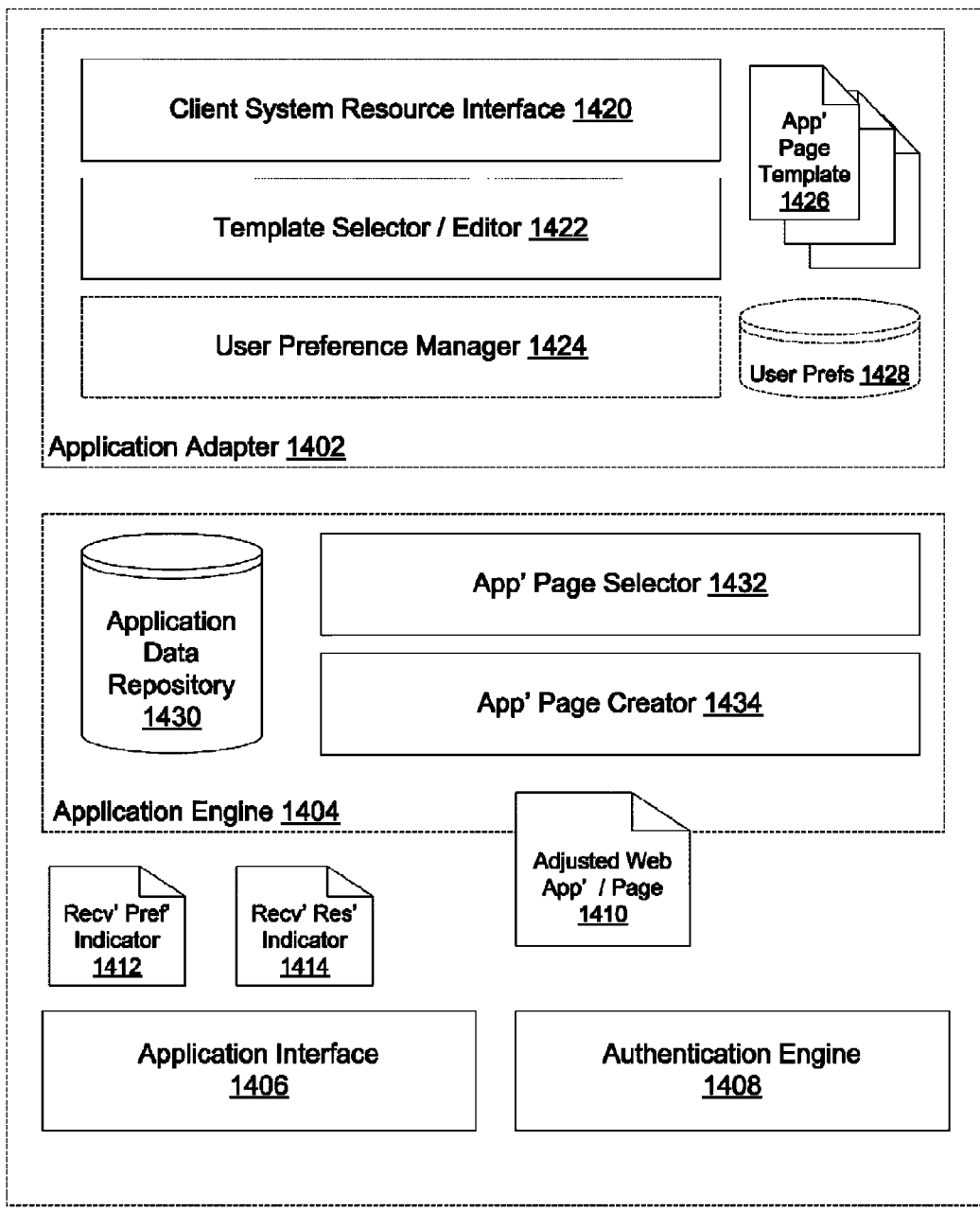
FIG. 14 is a block diagram of an example embodiment of an apparatus in accordance with the disclosed subject matter.

FIG. 14 is a block diagram of an example embodiment of an apparatus 1400 in accordance with the disclosed subject matter. As discussed in connection with FIGS. 2, 11, 12, and 13, the server device may adjust or edit a web page based upon the level of system resources of the receiving client device. In one embodiment, the apparatus 1400 may include an application server or other device. In various embodiments, some or all of the apparatus 1400 may be embodied in hardware, firmware, software, or a combination thereof.

In one embodiment, the apparatus 1400 may include an application interface 1406. The application interface 1406 may be configured to receive requests for web pages and other data served by the apparatus 1400. In various embodiments, the application interface 1406 may be configured to receive an indicator regarding the level of system resources 1414. As described above, this system resources indicator may include a direct indication of system resource (e.g., fields and values, etc.) or an indirect indication of system resources (e.g., a selection of one of a plurality of versions of the requested web page, etc.). It is understood that the above are merely a few illustrative examples to which the disclosed subject matter is not limited.

The application interface 1406 may be configured to transmit the adjusted web page to the requesting client device, as described above. Further, the application interface 1406 may be configured to transmit a message detailing the options available when adjusting the requested web page. As described above, this may take the form of a list of possible versions of the web page, and may include their contents or system resource usage expectations. In another embodiment, an options message may include a list of features or elements which may be adjusted (e.g., from videos to text, script variable values, etc.), and the client device may select the feature options as it desires, although it is understood that the above are merely a few illustrative examples to which the disclosed subject matter is not limited. The application interface 1406 may be configured to receive a message 1412 indicating the client device's selection(s); although such a message may be included in the system resource message 1414.

In one embodiment, the apparatus 1400 may include an authentication engine 1408 configured to authenticate a user onto the apparatus 1400, if needed. Further the authentication engine 1408 may be configured to identify the user for purposes of selecting a proper or associated server stored user preference file, as described below. In various embodiments, the communication between the authentication engine 1408 and the client device may occur via the application interface 1406.

In one embodiment, the apparatus 1400 may include an application adapter 1402. In various embodiments, the application adapter 1402 may be configured to adjust or edit the requested web page based upon the indicated level of system resources 1414, as described above.

In one embodiment, the application adapter 1402 may include a client system resource interface 1420, a page template selector/editor 1422 and/or a user preference manager 1424. In the illustrated embodiment, the application adapter 1402 may be configured to employ a template model in which web pages are defined via templates which are then fleshed-out of filled-in by the application engine 1404. These dynamically created web pages may include variables, include statements, or other programming-like features that allow the web page to be created by the apparatus 1400 based upon a database 1430 of data (e.g., news stories, etc.). Embodiments that include the use of static web pages are contemplated and briefly discussed but not discussed in detail.

In various embodiments, the client system resource interface 1420 may be configured to process the indicator 1414 of system resources from the client device. This may include determining which system resources to conserve or which version or template of the web page most closely meets the client device's needs or desires. Further, in one embodiment, the client system resource interface 1420 may be configured to provide a message detailing the available versions of the web page or the features or elements which may be adjusted.

In some embodiments, the page template selector or editor 1422 may be configured to dynamically edit or adjust the requested page, based in part upon the received indicator of system resources 1414. In various embodiments, the page template selector or editor 1422 may be configured to edit or adjust the various elements of the requested web page, as described above. In another embodiment, the page template selector or editor 1422 may be configured to select a version or template of the requested web page 1426 based upon the indicator 1414. In yet another embodiment, the page template selector or editor 1422 may be configured to select a template of the web page 1426 and then further edit or adjust elements within the template based upon the indicator 1414.

In one embodiment, the user preference manager 1424 may be configured to influence the editing or adjustment of the elements of the requested web page based upon user preferences 1428. In one embodiment, the user preferences 1428 may be stored locally and collected from the client device or from a preference server. In some embodiments, the user preferences 1428 may be manually input by a user. In the cases in which as user is identifiable (e.g., after authentication, etc.), preferences 1428 specific to the user may be used. Otherwise, a baseline set of user preferences 1428 may be employed. In various embodiments, a set of personalized user preferences 1428 based upon user similar to the current user may be employed, as described above. Some embodiments may not include a user preference manager 1424 and instead base the adjustment of the elements or the selection of a web page template 1426 upon the received indicator of system resources 1414.

In one embodiment, the application engine 1404 may be configured to generate the requested web page based upon the adjusted web page template 1426. The result web page may be referred to as the adjusted web page 1410. As described above, some embodiments may include static web pages which do not require the processing of the application engine 1404.

In the illustrated embodiment, the adjusted web page template may include variables or fields which should be expanded or filled in by content from a database (e.g., database 1430, etc.). In such an embodiment, the application page creator 1434 may inspect the adjusted web page template for fields or variables that need to be expanded with content from the application data repository or DB 1430. DB 1430 may include things such as news stories, etc. The expanded web page, suitable for transmission to and consumption by the client device may be created by the application page creator 1434 the expansion of the fields or variables.

The application page selector 1432 may be configured to select pages or files which are to be included with or associated with the adjusted web page 1410. Such associated files may include video files, image files, script files, style or formatting description files, etc. It is understood that the above are merely a few illustrative examples to which the disclosed subject matter is not limited.

The application engine 1404 may be configured to generate the adjusted web page 1410 from the associated files, the content or application data DB 1430, and the adjusted or selected web page template 1426. This adjusted web page 1410 may then be transmitted to the requesting client device.

In some embodiments, the user may request that the adjusted elements be restored to an unadjusted state, similarly to the restoration process described above. In such an embodiment, the application adapter 1402 may be configured to restore the requested elements. For example, a video element may be replaced with an image element, but the image element may indicate that a video is available. In such an embodiment, the user may request the adjusted video element. This video element or file may be transmitted to the client device.

Figure 15:
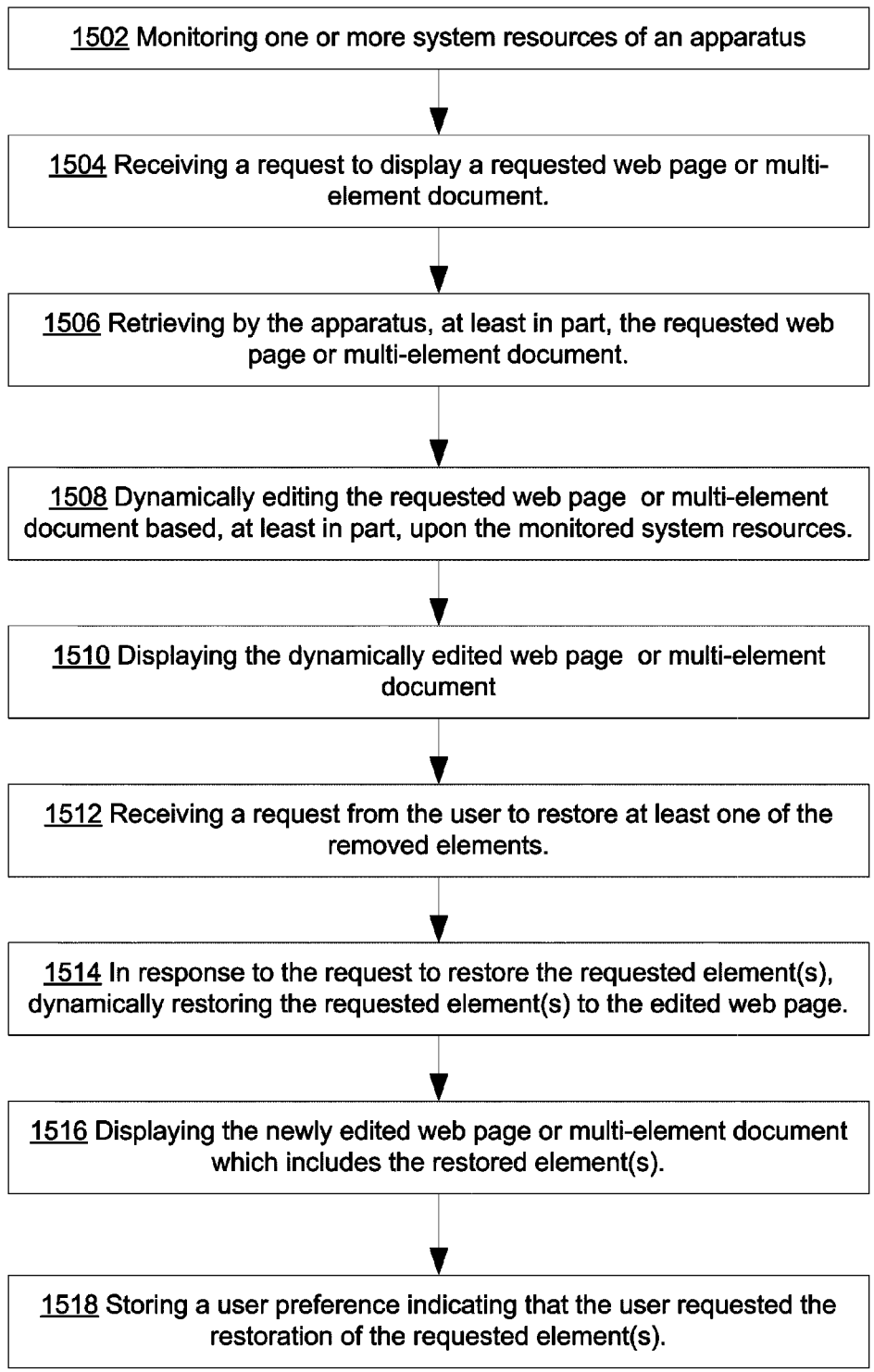
FIG. 15 is a flowchart of an example embodiment of a technique in accordance with the disclosed subject matter.

FIG. 15 is a flow chart of an example embodiment of a technique 1500 in accordance with the disclosed subject matter. As discussed in connection with FIGS. 2, 3, 4, 5, 6, and 10, the client device may edit a received web page based upon the level of system resources. In various embodiments, the technique 1500 may be used or produced by the systems such as those of FIG. 2, 6, or 10. Although, it is understood that the above are merely a few illustrative examples to which the disclosed subject matter is not limited. It is understood that the disclosed subject matter is not limited to the ordering of or number of actions illustrated by technique 1500.

Block 1502 illustrates that, in one embodiment, one or more system resources of the apparatus may be monitored, as described above. In various embodiments, one or more of the action(s) illustrated by this Block may be performed by the apparatuses or systems of FIG. 2, 5, or 6, the system resource monitor 216 of FIG. 2 or the system resource monitor interface 504 of FIG. 5, as described above.

Block 1504 illustrates that, in one embodiment, a request to display or retrieve a requested web page or multi-element document may be received, as described above. In various embodiments, one or more of the action(s) illustrated by this Block may be performed by the apparatuses or systems of FIG. 2, 5, or 6, the web browser or application 218 of FIG. 2 or the user interface 512 of FIG. 5, as described above.

Block 1506 illustrates that, in one embodiment, at least part of the requested web page or multi-element document may be received, as described above. In some embodiments, the web page may include a multi-element document. In various embodiments, one or more of the action(s) illustrated by this Block may be performed by the apparatuses or systems of FIG. 2, 5, or 6, the web browser or application 218 of FIG. 2 or the user interface 512 of FIG. 5, as described above.

Block 1508 illustrates that, in one embodiment, the requested web page or multi-element document may be dynamically edited based, at least in part, upon the monitored system resources, as described above. In various embodiments, dynamically editing may include removing elements from the requested web page or multi-element document that would consume more than a threshold level of system resources, as described above. In another embodiment, dynamically editing may include replacing each removed element with a placeholder element that indicates that the removed element has been removed from the requested web page, as described above. In yet another embodiment, dynamically editing may include editing a client-side script to reduce the amount of system resources consumed as a result of the client-side script's execution, as described above. Further, dynamically editing may also include removing one or more elements of the requested web page or multi-element document, as described above.

In some embodiments, dynamically editing may include editing the requested web page or multi-element document based upon a set of user preferences, as described above. In various embodiments, the set of user preferences may include information regarding previous indications from the user as to which portions of previous web pages or multi-element documents the user wished to be displayed, as described above. In various embodiments, dynamically editing may include requesting the set of user preferences from a remote device configured to store a plurality of sets of user preferences each set associated with a respective user, as described above. In various embodiments, one or more of the action(s) illustrated by this Block may be performed by the apparatuses or systems of FIG. 2, 5, or 6, the web browser or application 218 of FIG. 2 or the page editor 508 of FIG. 5, as described above.

Block 1510 illustrates that, in one embodiment, the dynamically edited web page or multi-element document may be displayed, as described above. In one embodiment, displaying may include displaying, to a user, an indication that one or more elements of the requested web page or multi-element document have been removed from the requested web page or multi-element document, as described above. In various embodiments, one or more of the action(s) illustrated by this Block may be performed by the apparatuses or systems of FIG. 2, 5, or 6, the web browser or application 218 of FIG. 2 or the rendering engine 510 or user interface 512 of FIG. 5, as described above.

Block 1512 illustrates that, in one embodiment, a request from the user to restore at least one of the removed elements may be received, as described above. In various embodiments, one or more of the action(s) illustrated by this Block may be performed by the apparatuses or systems of FIG. 2, 5, or 6, the web browser or application 218 of FIG. 2 or the rendering engine 510 or user interface 512 of FIG. 5, as described above.

Block 1514 illustrates that, in one embodiment, in response to the request to restore the requested element(s), the requested element(s) may be dynamically restored to the edited web page or multi-element document, as described above. In various embodiments, one or more of the action(s) illustrated by this Block may be performed by the apparatuses or systems of FIG. 2, 5, or 6, the web browser or application 218 of FIG. 2 or the page editor 508 of FIG. 5, as described above.

Block 1516 illustrates that, in one embodiment, the newly edited web page or multi-element document which includes the restored element(s) may be displayed, as described above. In various embodiments, one or more of the action(s) illustrated by this Block may be performed by the apparatuses or systems of FIG. 2, 5, or 6, the web browser or application 218 of FIG. 2 or the rendering engine 510 or user interface 512 of FIG. 5, as described above.

Block 1518 illustrates that, in one embodiment, a user preference indicating that the user requested the restoration of the requested element(s) may be stored, as described above. In various embodiments, the user preferences may be stored locally or remotely, as described above. Block may be performed by the apparatuses or systems of FIG. 2, 5, or 6, the web browser or application 218 of FIG. 2 or the user preference manager 532 of FIG. 5, or the preference server 606 of FIG. 6, as described above.

FIG. 16 is a flow chart of an example embodiment of a technique 1600 in accordance with the disclosed subject matter. As described above in reference to FIGS. 7, 8, 9, and 10, the client device may display the amount of system resources consumed by each tab, web application, or other level of measurement or display. In various embodiments, the technique 1600 may be used or produced by the systems such as those of FIG. 2, 5, 6, or 8. Although, it is understood that the above are merely a few illustrative examples to which the disclosed subject matter is not limited. It is understood that the disclosed subject matter is not limited to the ordering of or number of actions illustrated by technique 1600.

Block 1602 illustrates that, in one embodiment, the number of open tabs in one or more tabbed based browsers running on the computer may be identified, as described above. In various embodiments, one or more of the action(s) illustrated by this Block may be performed by the apparatuses or systems of FIG. 2, 5, or 6, the system resource monitor 216 of FIG. 2 or the system resource monitor interface 1014 of FIG. 10, as described above.

Block 1604 illustrates that, in one embodiment, the system resource usage of each tab may be determined, as described above. In various embodiments, determining may include generating a histogram for each tab when each tab is opened, as described above. In some embodiments, generating a histogram may include creating a new histogram for each tab when each tab is opened, as described above. In another embodiment, generating a histogram may include opening a preexisting histogram for each tab saved from a previous browsing session, as described above.

In various embodiments, determining may include measuring the system resource usage of each tab at a plurality of intervals over the lifetime of the respective tab, as described above. Determining may also include populating the histogram for each tab with each measurement of that tab's system resource usage to create a system resource usage distribution for that tab, as described above. Further determining may include using a statistical measure of the system resource usage distribution of each tab to determine the system resource usage of each tab, as described above. In various embodiments, one or more of the action(s) illustrated by this Block may be performed by the apparatuses or systems of FIG. 2, 5, or 6, the system resource monitor 216 of FIG. 2 or the system resource monitor interface 1014 of FIG. 10, as described above.

Block 1606 illustrates that, in one embodiment, the system resource usage of each tab may be displayed in a system resource meter, as described above. In various embodiments, one or more of the action(s) illustrated by this Block may be performed by the apparatuses or systems of FIG. 2, 5, or 6, the system resource monitor 216 of FIG. 2 or the system resource monitor interface 1014 of FIG. 10, as described above.

Block 1608 illustrates that, in one embodiment, the histogram may be aged to remove system resource usage measurements that are older than a predetermined period of time, as described above. In various embodiments, one or more of the action(s) illustrated by this Block may be performed by the apparatuses or systems of FIG. 2, 5, or 6, the system resource monitor 216 of FIG. 2 or the system resource monitor interface 1014 of FIG. 10, as described above.

FIG. 17 is a flow chart of an example embodiment of a technique 1700 in accordance with the disclosed subject matter. As disused in reference to FIGS. 9 and 10, the client device may throttle tabs or web applications, to reduce or control the use of system resources. In various embodiments, the technique 1700 may be used or produced by the systems such as those of FIG. 2, 5, 6, or 10. Although, it is understood that the above are merely a few illustrative examples to which the disclosed subject matter is not limited. It is understood that the disclosed subject matter is not limited to the ordering of or number of actions illustrated by technique 1700.

Block 1702 illustrates that, in one embodiment, the number of web applications running in open tabs in one or more tab based browsers running on the computer may be identified, as described above. In various embodiments, one or more of the action(s) illustrated by this Block may be performed by the apparatuses or systems of FIG. 2, 5, or 6, the system resource monitor 216 of FIG. 2 or the system resource monitor interface 504 of FIG. 5, as described above.

Block 1704 illustrates that, in one embodiment, the system resource usage of each web application in each open tab may be measured, as described above. In various embodiments, one or more of the action(s) illustrated by this Block may be performed by the apparatuses or systems of FIG. 2, 5, or 6, the system resource monitor 216 of FIG. 2 or the system resource monitor interface 504 of FIG. 5, as described above.

Block 1706 illustrates that, in one embodiment, the system resource usage of each web application in each open tab may be compared to a system resource threshold, as described above. In various embodiments, the system resource threshold may be one or more of the following: identical for all tabs, a constant value, a function of the estimated power left in a battery that powers the computer, a function of a web application running in the tab, etc. It is understood that the above are merely a few illustrative examples to which the disclosed subject matter is not limited. In various embodiments, one or more of the action(s) illustrated by this Block may be performed by the apparatuses or systems of FIG. 2, 5, or 6, the system resource monitor 216 of FIG. 2 or the system resource monitor interface 504 of FIG. 5, as described above.

Block 1708 illustrates that, in one embodiment, any web application in an open tab whose power draw exceeds the system resource threshold may be throttled, as described above. In one embodiment, throttling may include lowering the execution priority of any open tab whose power draw exceeds a power threshold, as described above. In another embodiment, throttling may include lowering the network refresh rate of any open tab whose power draw exceeds the power threshold, as described above. In yet another embodiment, throttling may include lowering the display refresh rate of any open tab whose power draw exceeds the power threshold, as described above. In some embodiments, throttling may include reducing the polling frequency of any open tab whose system resource usage exceeds the system resource threshold.

In yet another embodiment, throttling may include monitoring a processor usage of the computer, and controlling a processor demand that one or more tabs in a tabbed browser place on the processor to induce the processor to enter a lower power state, as described above. In various embodiments, one or more of the action(s) illustrated by this Block may be performed by the apparatuses or systems of FIG. 2, 5, or 6, the system resource monitor 216 of FIG. 2 or the system resource monitor interface 504 of FIG. 5, as described above.

FIG. 18 is a flow chart of an example embodiment of a technique 1800 in accordance with the disclosed subject matter. As described above in reference to FIGS. 2, 11, 12, 13, and 14, the server may be adjust or edit web pages based upon the level of system resources of the requesting client device. In various embodiments, the technique 1800 may be used or produced by the systems such as those of FIG. 2, 3, 4, 6, 11, or 14. Although, it is understood that the above are merely a few illustrative examples to which the disclosed subject matter is not limited. It is understood that the disclosed subject matter is not limited to the ordering of or number of actions illustrated by technique 1800.

Block 1802 illustrates that, in one embodiment, a request from a client device for a web page or multi-element document may be received, as described above. In various embodiments, one or more of the action(s) illustrated by this Block may be performed by the apparatuses or systems of FIG. 2, 6, or 14, the application server 204 of FIG. 2 or the application interface 1406 of FIG. 14, as described above.

Block 1803 illustrates that, in one embodiment, the client device may be provided with an indication of the web page or multi-element document elements that may be adjusted, as described above. In various embodiments, one or more of the action(s) illustrated by this Block may be performed by the apparatuses or systems of FIG. 2, 6, or 14, the application server 204 of FIG. 2 or the application interface 1406 of FIG. 14, as described above.

Block 1804 illustrates that, in one embodiment, a request may be made, to the client device, the indicator related to the level of system resources of the client device. In various embodiments, one or more of the action(s) illustrated by this Block may be performed by the apparatuses or systems of FIG. 2, 6, or 14, the application server 204 of FIG. 2 or the application interface 1406 of FIG. 14, as described above.

Block 1806 illustrates that, in one embodiment, an indicator related to the level of system resources of the client device may be received from the client device, as described above. In various embodiments, receiving an indicator may include receiving an indication of an amount of operating power included by the client device, as described above. In another embodiment, receiving an indicator may include receiving a selection from the client device as to which element options or templates the client device wishes to receive, as described above. In another embodiment, receiving may include receiving an indication of the bandwidth provided by a communications channel employed to communicate between the server and the client device, as described above. In various embodiments, one or more of the action(s) illustrated by this Block may be performed by the apparatuses or systems of FIG. 2, 6, or 14, the application server 204 of FIG. 2 or the application interface 1406 of FIG. 14, as described above.

Block 1808 illustrates that, in one embodiment, one or more of the elements included by the requested web page or multi-element document may be dynamically adjusted based, at least in part, upon the received indicator, as described above. In various embodiments, dynamically adjusting may include selecting one of a plurality of web page or document templates based upon the received indicator, wherein each of the plurality of web page or document templates is based upon a respective system resource usage profile, as described above. In another embodiment, dynamically editing may include adjusting the aggregate size of the elements based upon the indicated bandwidth of the communications channel, as described above. In yet another embodiment, dynamically adjusting may include adjusting the element(s) based upon the indicated amount of operating power included by the client device, as described above.

In one embodiment, dynamically adjusting may include retrieving a set of user preferences associated with a user of the client device, as described above. In some embodiments, the set of user preferences may include preferences indicating which elements the user finds important, as described above. Further dynamically editing may include adjusting the element(s) based upon the set of user preferences and the indicator of the level of system resources, as described above.

In another embodiment, dynamically adjusting may include determining at least one system resource to be conserved, and replacing elements with replacement elements, as described above. In such an embodiment, the replacement elements may be configured to cause the client system to consume less of the determined system resource than the replaced elements, as described above. In various embodiments, one or more of the action(s) illustrated by this Block may be performed by the apparatuses or systems of FIG. 2, 6, or 14, the application server 204 of FIG. 2 or the application adapter 1402 of FIG. 14, as described above.

Block 1810 illustrates that, in one embodiment, the adjusted web page or multi-element document may be transmitted to the client device, as described above. In various embodiments, one or more of the action(s) illustrated by this Block may be performed by the apparatuses or systems of FIG. 2, 6, or 14, the application server 204 of FIG. 2 or the application interface 1406 of FIG. 14, as described above.

Block 1812 illustrates that, in one embodiment, a request from the client device for one or more of the replaced elements may be received, as described above. In various embodiments, one or more of the action(s) illustrated by this Block may be performed by the apparatuses or systems of FIG. 2, 6, or 14, the application server 204 of FIG. 2 or the application interface 1406 of FIG. 14, as described above.

Block 1814 illustrates that, in one embodiment, the requested element may be transmitted to the client device, as described above. In some embodiments, a newly adjusted version of the web page or multi-element document may be transmitted to the client, as described above. In various embodiments, one or more of the action(s) illustrated by this Block may be performed by the apparatuses or systems of FIG. 2, 6, or 14, the application server 204 of FIG. 2 or the application interface 1406 or application adapter 1402 of FIG. 14, as described above.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosed subject matter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for displaying system resource usage of a computer, comprising:
identifying a number of open tabs in a tab based browser running on the computer;
determining the system resource usage of each of the open tabs at a plurality of time intervals based on a system resource usage distribution for that tab, the system resource usage of each of the open tabs including at least a use of available power, wherein
the determining of the system resource usage includes generating a histogram for at least one of the open tabs to create a system resource usage distribution for the at least one open tab, and
the histogram for an open tab includes a measurement of the tab's system resource usage; and
displaying the system resource usage based on the distribution of data of each of the open tabs, including the use of available power, of each of the open tabs in a system resource meter configured to display the distribution of data.

2. The method of claim 1, wherein the determining the system resource usage of each of the open tabs further comprises:
generating a histogram for each tab when each tab is opened.

3. The method of claim 2, wherein the generating a histogram for each tab when each tab is opened, further comprises creating a new histogram for each tab when each tab is opened.

4. The method of claim 2, wherein the generating a histogram for each tab when each tab is opened, further comprises opening a preexisting histogram for each of the open tabs saved from a previous browsing session.

5. The method of claim 2, further comprising aging the histogram to remove system resource usage measurements that are older than a predetermined period of time.

6. A method of preserving one or more system resources in a computer, comprising:
identifying a number of web applications running in open tabs in one or more tab based browsers running on the computer;
measuring a system resource usage of each of the web applications in each of the open tabs, the system resource usage including at least a use of available power;
wherein the histogram for an open tab includes a measurement of that tab's system resource usage at a plurality of time intervals based on the system resource usage of each of the web applications in that tab;
comparing the system resource usage, including the use of available power, of the open tabs to a system resource threshold, wherein
the comparing of the system resource usage includes generating a histogram for at least one open tab to create a system resource usage distribution for the at least one open tab, and
the histogram for an open tab includes a measurement of that tab's system resource usage at a plurality of time intervals based on the system resource usage of each of the web applications in that tab; and
throttling any web application in any of the open tabs whose power draw exceeds the system resource threshold.

7. The method of claim 6, wherein the system resource threshold is identical for all of the open tabs.

8. The method of claim 6, wherein the system resource threshold is a constant.

9. The method of claim 6, wherein the system resource threshold is a function of the estimated power left in a battery that powers the computer.

10. The method of claim 6, wherein the system resource threshold is a function of a web application running in the open tab.

11. The method of claim 6, wherein throttling any of the open tabs whose system resource usage exceeds the system resource threshold comprises lowering the execution priority of any of the open tabs whose power draw exceeds a power threshold.

12. The method of claim 6, wherein throttling any of the open tabs whose system resource usage exceeds the system resource threshold comprises lowering the network refresh rate of any of the open tabs whose power draw exceeds the power threshold.

13. The method of claim 6, wherein throttling any of the open tabs whose system resource usage exceeds the system resource threshold comprises lowering the display refresh rate of any of the open tabs whose power draw exceeds the power threshold.

14. The method of claim 6, wherein throttling any of the open tabs whose system resource usage exceeds the system resource threshold further comprises reducing the polling frequency of any of the open tabs whose system resource usage exceeds the system resource threshold.

15. The method of claim 6, wherein throttling any of the open tabs whose system resource usage exceeds the system resource threshold further comprises:
monitoring a processor usage of the computer; and
controlling a processor demand that one or more of the open tabs in the tab based browser place on the processor to induce the processor to enter a lower power state.

16. An apparatus comprising:
a processor; and
a memory to store executable code that, when executed, causes the processor to:
measure a system resource usage of each of the web applications in each of the open tabs, the system resource usage including at least a use of available power;
compare the system resource usage, including the use of available power, of the open tabs to a system resource threshold, wherein the comparing of the system resource usage includes generating a histogram for at least one open tab to create a system resource usage distribution for the at least one open tab, and the histogram for an open tab includes a measurement of that tab's system resource usage at a plurality of time intervals based on the system resource usage of each of the web applications in that tab; and throttle any web application in any of the open tabs whose power draw exceeds the system resource threshold.

17. The apparatus of claim 16, wherein the system resource threshold is identical for all of the open tabs.

18. The apparatus of claim 16, wherein the system resource threshold is a function of a web application running in the open tab.

19. The apparatus of claim 16, wherein throttling any of the open tabs whose system resource usage exceeds the system resource threshold comprises lowering the execution priority of any of the open tabs whose power draw exceeds a power threshold.

20. The apparatus of claim 16, wherein throttling any of the open tabs whose system resource usage exceeds the system resource threshold further comprises:

monitoring a processor usage of the apparatus; and controlling a processor demand that one or more of the open tabs in the tab based browser place on the processor to induce the processor to enter a lower power state.

* * * * *